Dec. 21, 1965   C. L. WHITEFORD   3,224,575
PROTECTIVE COVERS FOR CANS, PROTECTIVE PACKAGES
THEREOF AND METHODS OF FORMING AND
APPLYING SUCH COVERS
Filed April 29, 1959   9 Sheets-Sheet 1

Dec. 21, 1965   C. L. WHITEFORD   3,224,575
PROTECTIVE COVERS FOR CANS, PROTECTIVE PACKAGES
THEREOF AND METHODS OF FORMING AND
APPLYING SUCH COVERS
Filed April 29, 1959                9 Sheets-Sheet 2

Dec. 21, 1965  C. L. WHITEFORD  3,224,575
PROTECTIVE COVERS FOR CANS, PROTECTIVE PACKAGES
THEREOF AND METHODS OF FORMING AND
APPLYING SUCH COVERS
Filed April 29, 1959  9 Sheets-Sheet 3
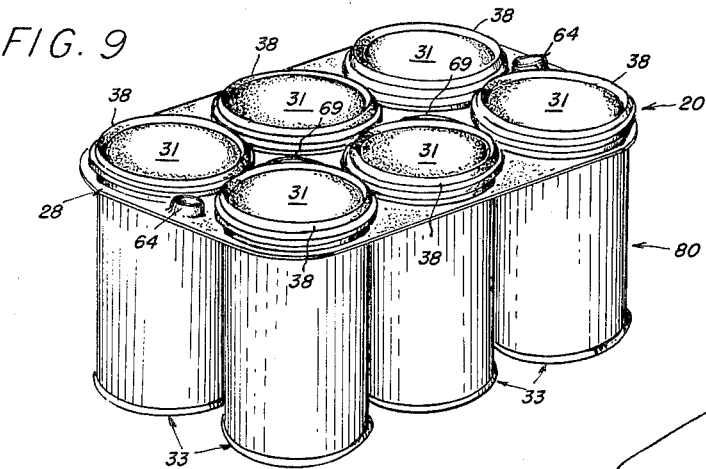
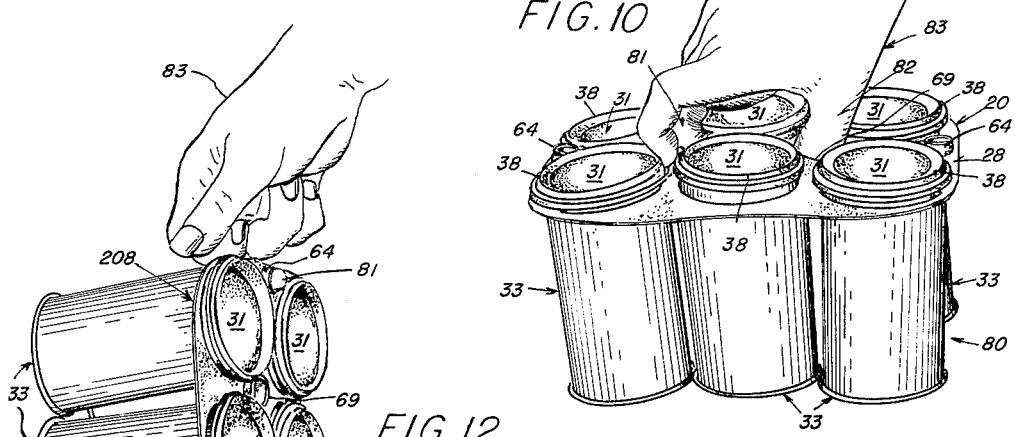
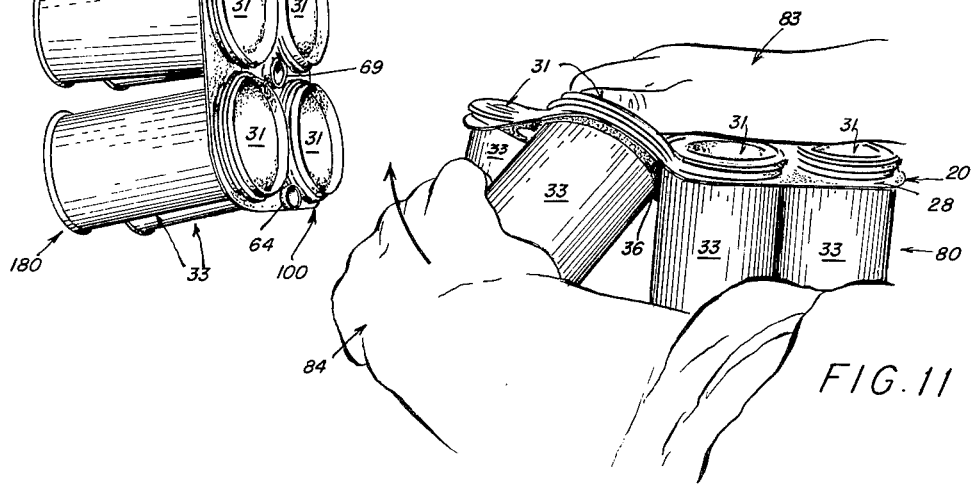

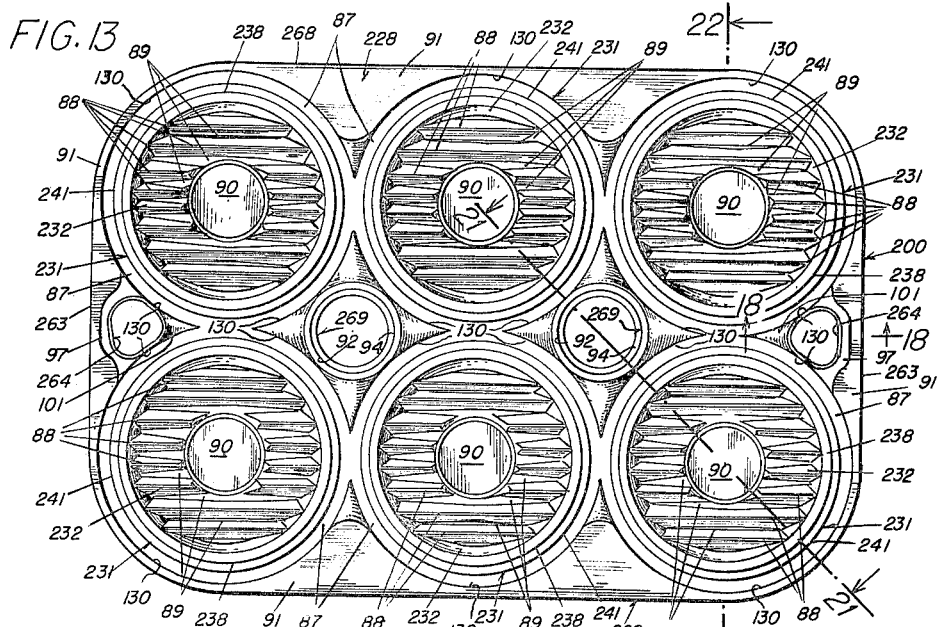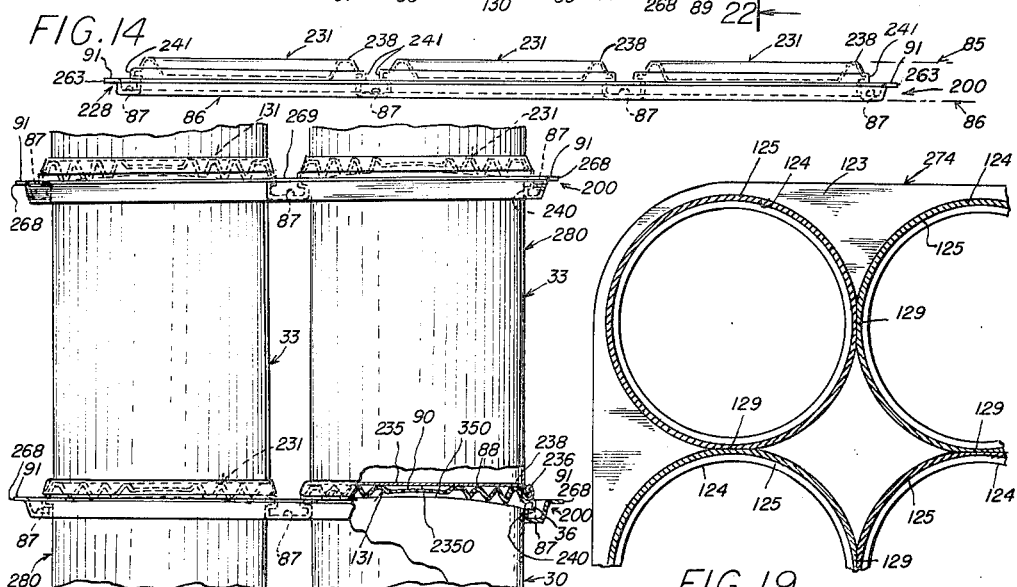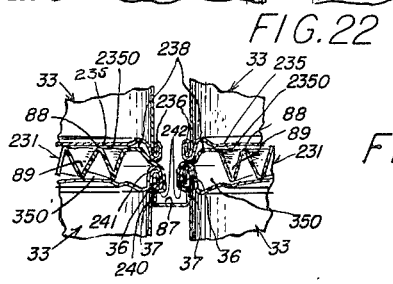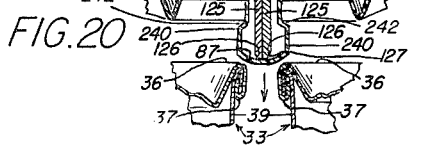

Dec. 21, 1965 C. L. WHITEFORD 3,224,575
PROTECTIVE COVERS FOR CANS, PROTECTIVE PACKAGES
THEREOF AND METHODS OF FORMING AND
APPLYING SUCH COVERS
Filed April 29, 1959 9 Sheets-Sheet 5
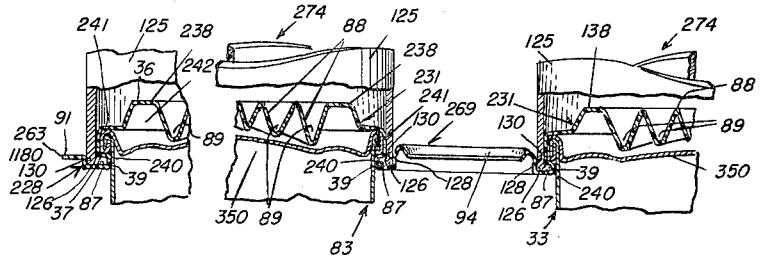
FIG. 21
FIG. 15
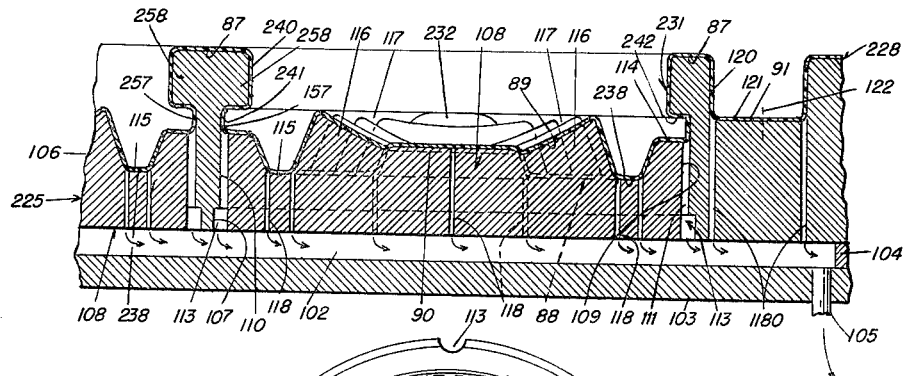
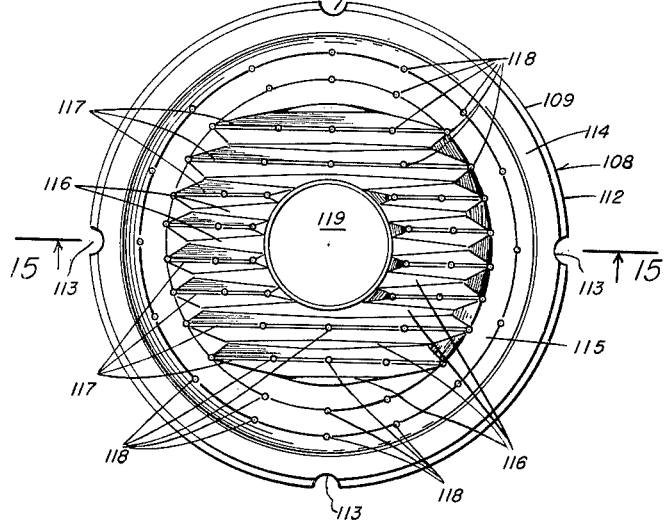
FIG. 16
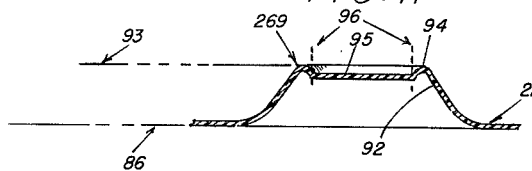
FIG. 17
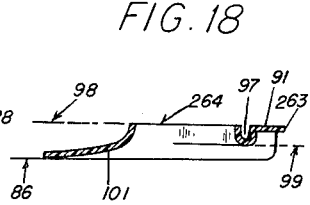
FIG. 18

Dec. 21, 1965  C. L. WHITEFORD  3,224,575
PROTECTIVE COVERS FOR CANS, PROTECTIVE PACKAGES
THEREOF AND METHODS OF FORMING AND
APPLYING SUCH COVERS
Filed April 29, 1959  9 Sheets-Sheet 7

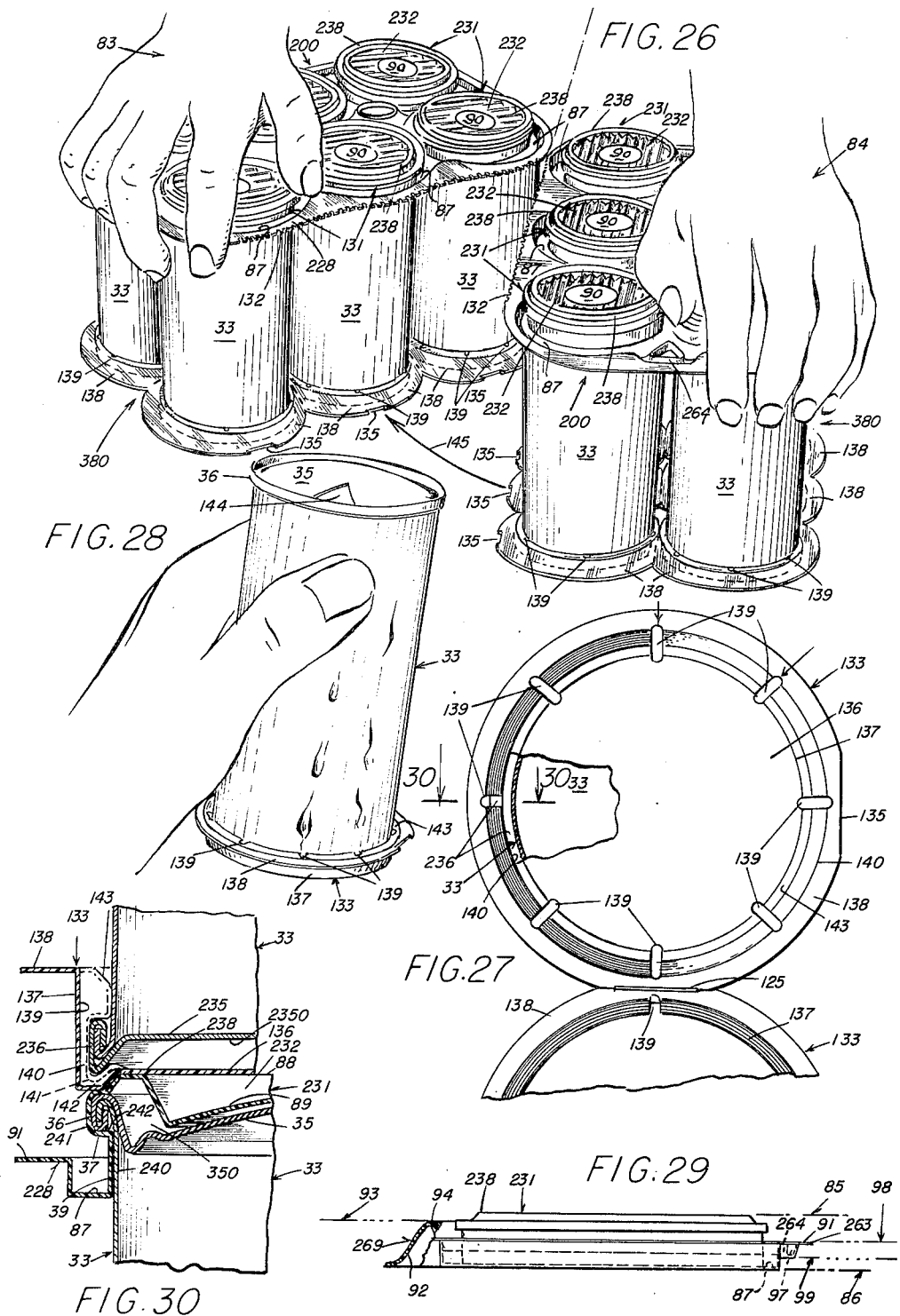

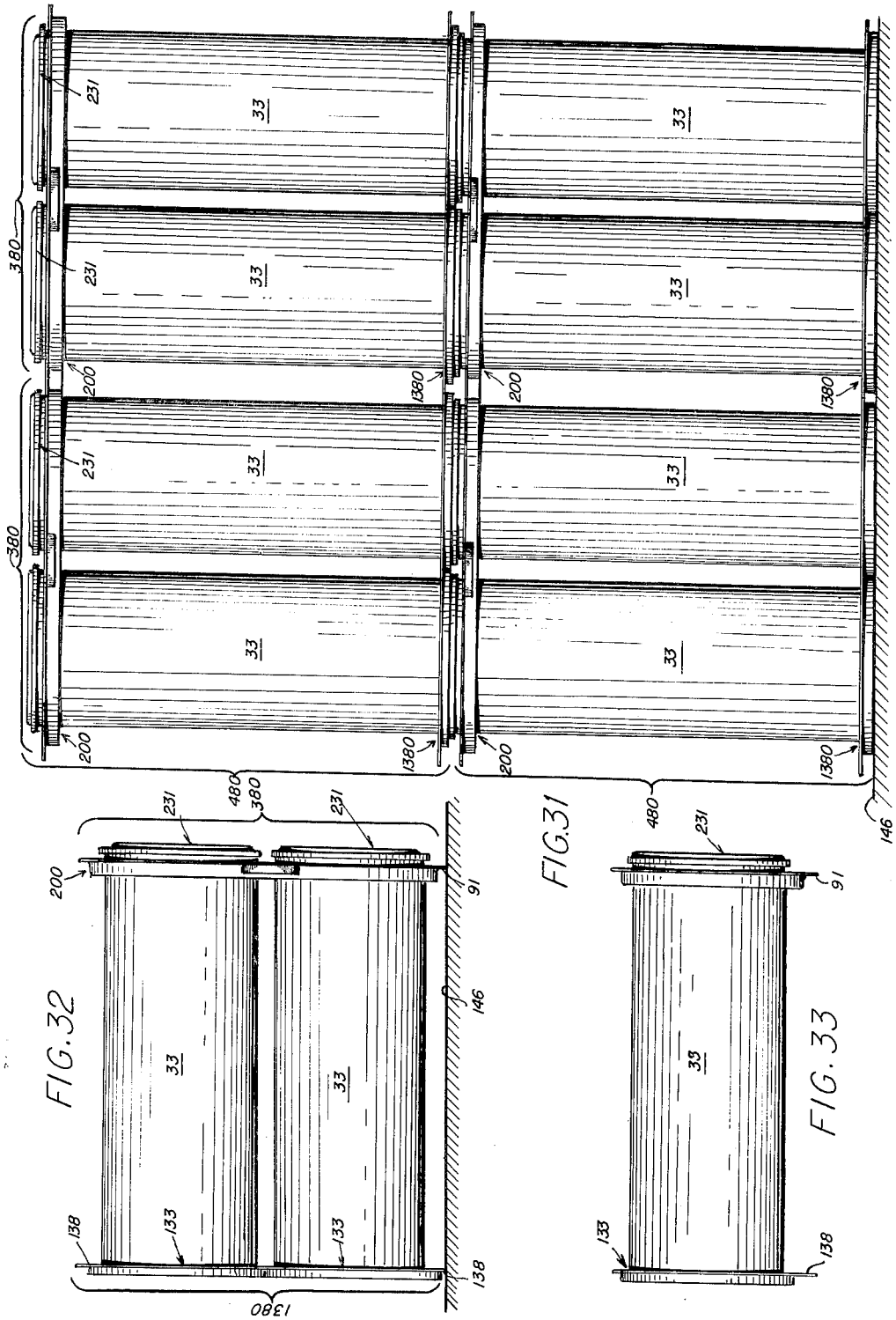

United States Patent Office 3,224,575
Patented Dec. 21, 1965

3,224,575
PROTECTIVE COVERS FOR CANS, PROTECTIVE PACKAGES THEREOF AND METHODS OF FORMING AND APPLYING SUCH COVERS
Carlton L. Whiteford, New Canaan, Conn., assignor, by mesne assignments, to R. A. Jones & Co., Inc., Covington, Ky., a corporation of Kentucky
Filed Apr. 29, 1959, Ser. No. 809,664
16 Claims. (Cl. 206—65)

The present invention relates to protective covers for relatively small cans, protective packages of a plurality of the cans and methods of making and applying such covers.

A general object of the present invention is to provide a unique and unusually serviceable protective cover for one or more conventional cylindrical cans having raised and laterally-projecting rim beads, such covers efficiently protecting the tops thereof in a sanitary manner while serving as effective suspending means for facilitating transportation and stacking, each such cover being readily adapted to use in a form to hold a plurality of such cans in a tight bundle to form a package thereof, and simple methods of making such covers and packages and applying the covers which are readily adapted to mass factory production.

A more specific object of the present invention is to provide such a package featuring a formed cover sheet member having a plurality of separated can-receptive pockets each provided with a tensioned band securely and snugly engaging an annular zone of the exterior can wall beneath its rim bead to permit suspension of the latter therefrom without danger of dropping free in transportation, handling and storing.

Another object is to provide such protective cover means in a form to facilitate secure stacking of the packages in stores.

A further object is the provision of a method which efficiently will produce such covers in a form best adapted to economical production, ease of use and application and effective securement of a bundle of the cans together, while facilitating their ready separation and removal.

Still another object of the invention is to provide such a package which, while keeping the can tops substantially free of accumulations of foreign matter and dust to avoid undue contamination of can tops making hazardous consumption of contents directly from the cans by contact with the lips, will permit wetting and submersion thereof in cooling baths without tendency of the package to disintegrate and the cans to fall apart.

A still further object is to provide such a cover in a form which assures a gasket tight seal about each can rim bead to preserve cleanliness of the can top and which may provide a practically germ-proof protection for the can top.

An additional object of the invention is to provide a package of a plurality of such cans in which the can-receptive pockets form gaseous medium entrapping chambers beyond the can ends to serve as protective cushions or shock absorbers, which may be supplemented to advantage by a bottom tray structure providing similar cushioning chambers while tying the cams more securely together in a tighter bundle or more rigid package, such cover and tray structures also providing effectively side bumper means for further protection.

And a further object of the invention is to provide such bottom tray structure in a form to permit ready separation of each can bottom receptive pocket thereof with the can nested therein to remain thereon as a protective coaster.

Yet another object of the present invention is to provide a simple and effective method of applying such a cover to one or more of such can tops without tendency to damage or improperly seat a can top-receptive pocket thereof while avoiding necessity for clamping surrounding portions of the cover sheet.

Other objects of the invention will in part be obvious and will in part appear hereinafter.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

For a fuller understanding of the nature and objects of the invention reference should be had to the following detailed description taken in connection with the accompanying drawings, in which.

Figure 1:
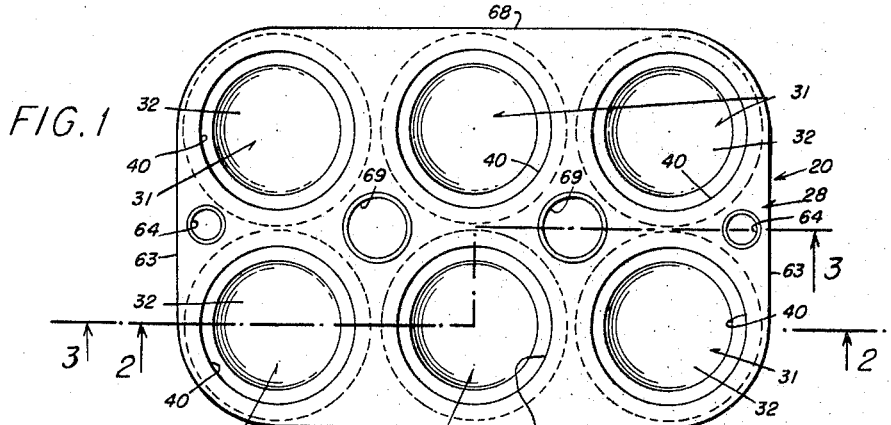
FIG. 1 is a bottom plan view of an embodiment of the protective cover of the present invention.
Figure 3:
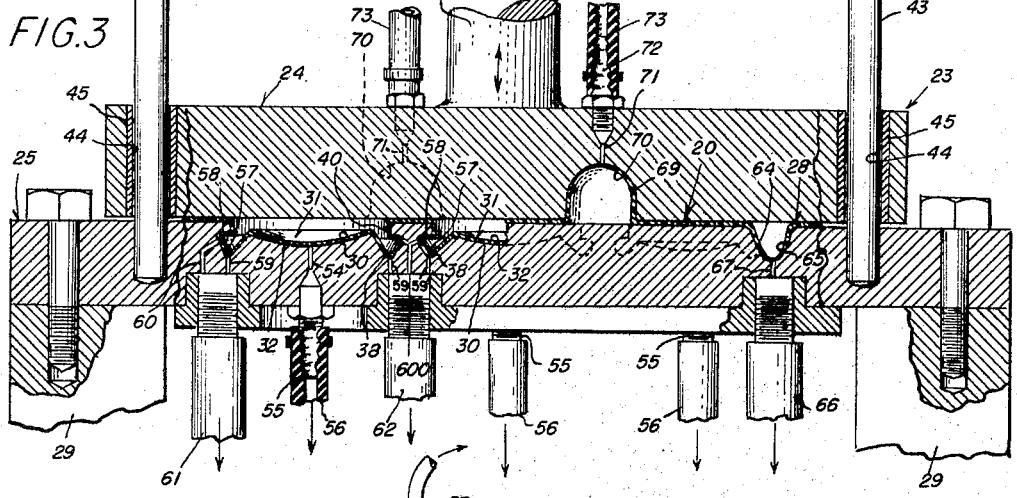
FIG. 3 is an elevational section of suitable vacuum molding equipment showing female mold structure thereof employable to advantage in the molding of the protective cover of FIGS. 1 and 2, section of the latter being taken substantially along line 3—3 of FIG. 1.
Figure 4:
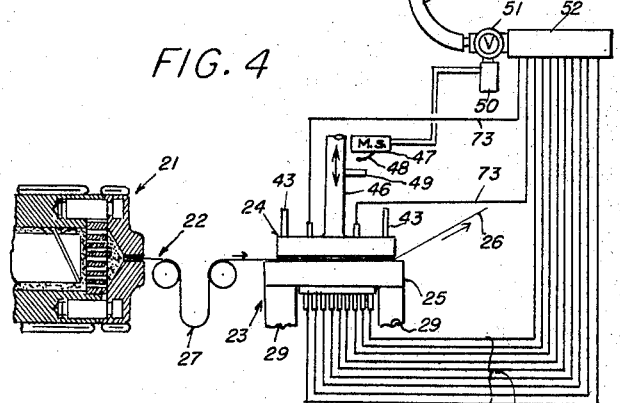
FIG. 4 is a diagrammatic view of vacuum molding equipment employing the apparatus structure of FIG. 3 and illustrating its use in association with conventional extruding equipment for production of plastic sheet material.
Figure 5:
Figure 6:
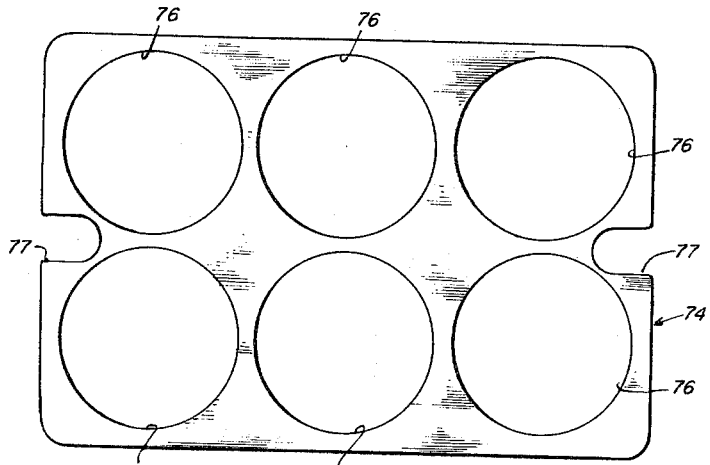
Figure 7:
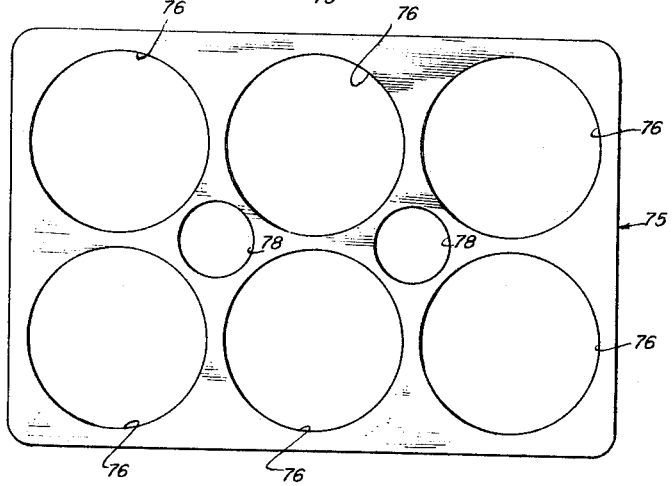
Figure 8:
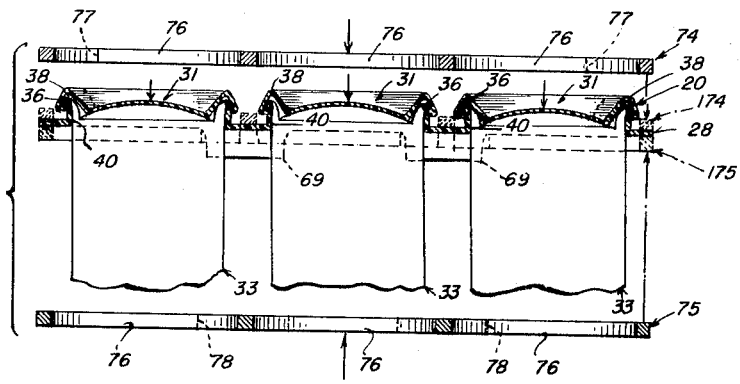
Figure 24:
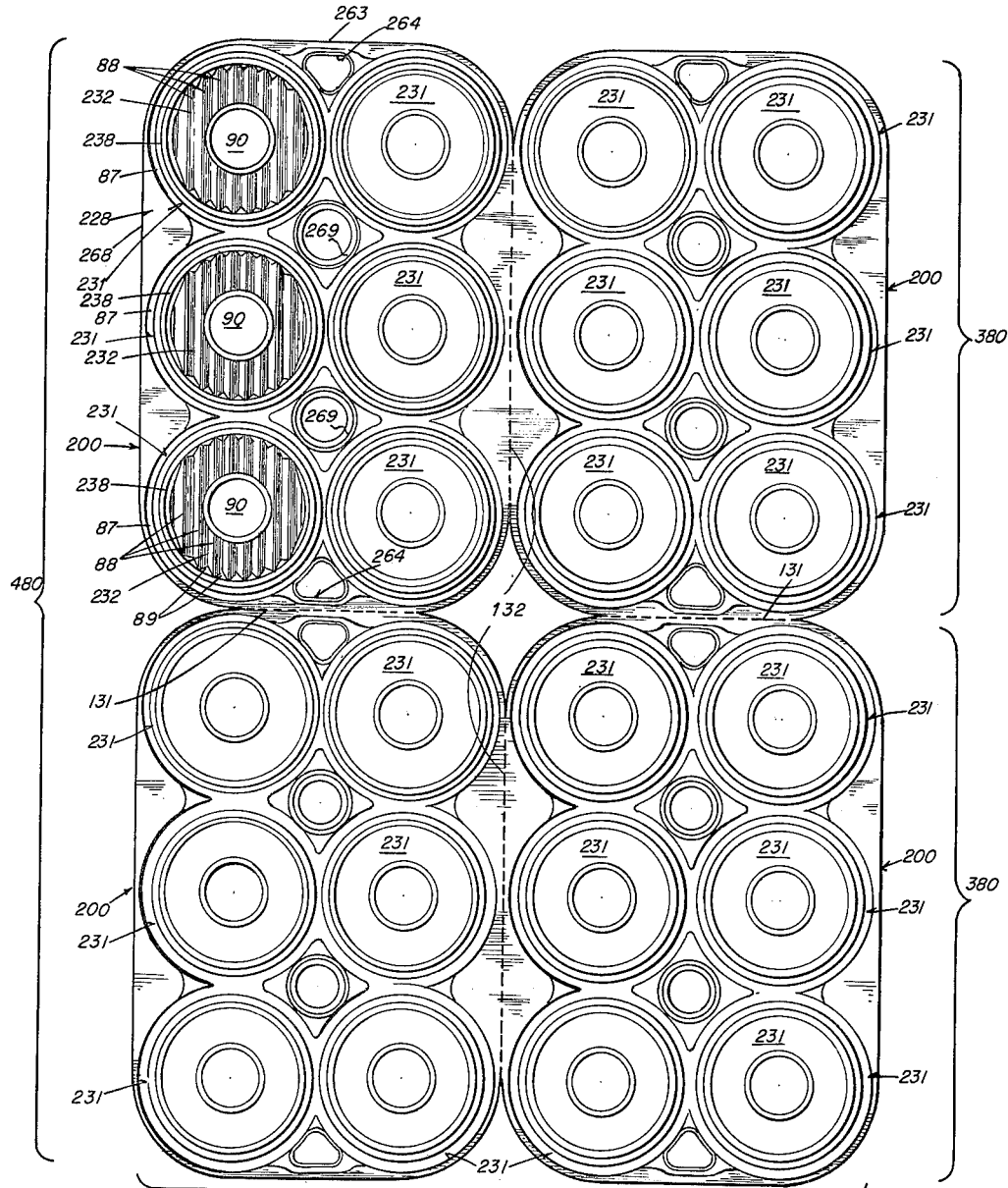
Figure 25:
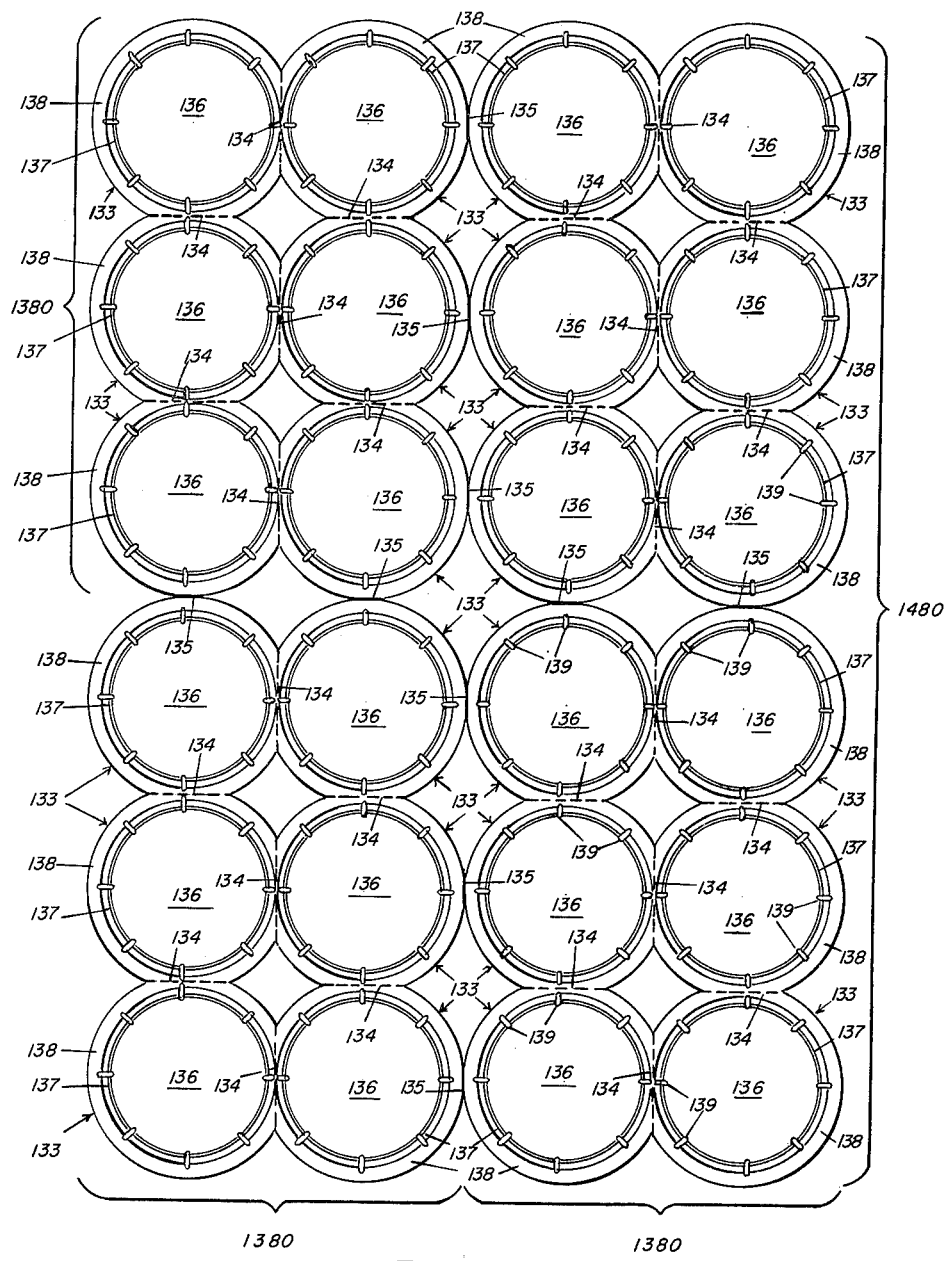

FIG. 5 is a detailed sectional view, with parts broken away, showing the relative shapes of a conventional cylindrical can, the end closure and rim bead thereof, and of a can-receptive pocket defined by the forming of a boss in the cover sheet by the equipment of FIGS. 3 and 4, depicting relative thicknesses of different areas of the can-receptive pocket in exaggerated style for purposes of illustration;

FIG. 6 is a plan view of one of a pair of clamping plates employed to snap the protective cover of FIG. 1 down over the ends of a plurality of the cans to form a completed package;

FIG. 7 is a plan view of the other of the clamping plates, companion to that illustrated in FIG. 6;

FIG. 8 is an exploded view, with parts broken away and in section, of a plurality of cans having the protective cover of FIG. 1 applied to the top ends thereof by means of the pair of complementary clamping plates illustrated in FIGS. 6 and 7;

FIG. 9 is a perspective view of a protective package including a plurality of the cans suitably tied together and suspended from the cover of FIG. 1;

FIG. 10 is a pictorial perspective view of the package illustrated in FIG. 9, showing one simple method of carrying the same by opposed grasping action of the thumb and a finger of one hand;

FIG. 11 is another pictorial perspective view of the package illustrated in FIGS. 9 and 10, indicating a simple method of snapping one of the cans from out of the package;

FIG. 12 is still another pictorial perspective view illustrating another simple procedure of carrying an embodiment of the package of the present invention in which the protective cover thereof is of greater rigidity than than of FIGS. 1, 9, 10 and 11;

FIG. 13 is a top plan view of a modified form of the protective cover illustrated in FIG. 1;

FIG. 14 is a side elevational view of the protective cover shown in FIG. 13;

FIG. 15 is an enlarged sectional view, with parts broken away and relative dimensions exaggerated for clarity, of the portion of a female suction mold which will form one of the can-receptive pockets and adjacent areas of the protective cover depicted in FIGS. 13 and 14, illustrating contouring of the latter thereagainst, this section being taken substantially on line 15—15 of FIG. 16;

FIG. 16 is a top plan view of an insert member of the mold structure shown in FIG. 15;

FIG. 17 is a vertical sectional detail to enlarged scale of the contoured area of the protective cover of FIGS. 13 and 14 at one of the medial finger-engageable sleeve means, showing a step in the formation thereof;

FIG. 18 is an enlarged sectional detail, the section being taken substantially on line 18—18 of FIG. 13;

FIG. 19 is a bottom plan view of about a quarter of a pressing or force applying structure adapted to apply the protective cover of FIGS. 13 and 14 to a plurality of or six cans, which may be employed therewith instead of the pair of clamping plates illustrated in FIGS. 6, 7 and 8, depending flange elements thereof being shown in horizontal section;

FIG. 20 is an enlarged vertical sectional detail of a portion of the protective cover shown in FIGS. 13 and 14 and the applying means of FIG. 19, indicating pressure application thereof down over can tops, portions of the latter being shown therein in section;

FIG. 21 is an enlarged section, with parts broken away, of the protective cover of FIG. 13 taken substantially along line 21—21 thereof, illustrating operation of the pressure applying flanges of the applying device depicted in FIG. 19 when employed to force can top ends into cover receptive pockets, portions of two such cans being shown in section with parts broken away;

FIG. 22 is an elevational view, with parts broken away and in section, of a plurality of packages of the present invention stacked one upon the other, with the protective cover of FIGS. 13 and 14 constituting a part of each and being shown in the top portion thereof as being sectioned substantially along line 22—22 of FIG. 13;

FIG. 23 is a fragmentary sectional view, substantially to actual scale, of the portion of FIG. 22 which shows adjacent portions of the bottoms of a pair of cans of one package seated upon adjacent portions of the covered tops of a pair of cans of a lower package;

FIG. 24 is a top plan view of a case of twenty-four cans covered by an embodiment of the protective cover of the present invention which is subdividable into four sections with each covering a bundle of six cans;

FIG. 25 is a top plan view of suitable coaster or tray structure in which the twenty-four cans of the cast lot of FIG. 24 preferably are seated or nested;

FIG. 26 is an end perspective view of the case lot of packaged cans illustrated in FIGS. 24 and 25, with parts omitted for clarity, illustrating separation of a pack of six cans therefrom.

Figure 34:
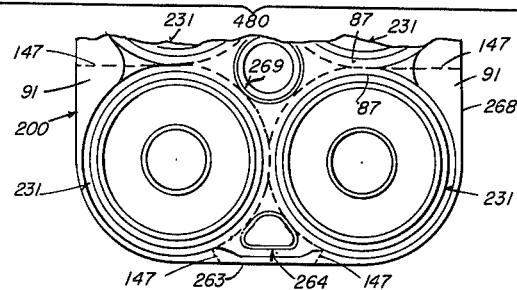

FIG. 27 is an enlarged top plan view, with parts broken away, of some of the bottom tray or coaster units for cans of the package units illustrated in FIG. 26, showing a portion of a can bottom in section and broken away in nested relation to one of them;

FIG. 28 is an enlarged perspective view of one of the cams illustrated in FIG. 26, showing the cover thereof removed, and with its top end wall provided with the usual cut out or dinked in opening for removing contents, with retention of the bottom coaster or tray thereon;

FIG. 29 is an enlarged side elevational view of one corner of the protective cover of FIGS. 13 and 14 including one of the can-receptive pockets, a portion of one of the medial finger-engageable sleeve means with part thereof broken away and in section, and a portion of an end finger-engageable means to illustrate relative elevations of the terminal plans thereof;

FIG. 30 is an enlarged sectional detail, with parts broken away, showing the relation of a bottom tray or coaster of a can of one package relative to the protective cover of a can of another package of the type illustrated in FIGS. 24 to 27 incl. when one six-can pack, or a case lot of four thereof, is stacked upon another such package, or case lot thereof, sectioning of the bottom coaster or tray of the superposed can being taken substantially on line 30—30 of FIG. 27;

FIG. 31 is an end elevational view of a case lot of cans protectively covered and nested in bottom coaster or tray structure of the type illustrated in FIGS. 24 and 25, showing it stacked upon a similar case lot thereof;

FIG. 32 is an end elevational view of one of the six-can packs shown in FIG. 26 resting upon its side upon a supporting surface, illustrating protective support of the cans above the surface by the edges of the protective cover and bottom tray structure;

FIG. 33 is a side view of one of the cans separated from the package of FIGS. 26 and 32; and FIG. 34 is a top plan view, with details omitted and portions broken away, of an end portion of one of the cover units of FIG. 24 which is embodied in a pack of six cans thereof, illustrating means for permitting ready separation of each can from the pack of six to produce the six-can unit of FIG. 32.

Referring to the drawings, in which like numerals identify similar parts throughout, it will be seen from FIGS. 1 to 11 incl. that an embodiment of the cover member of a protective package of a plurality of conventional cylindrical cans may be in the form of a shaped cover sheet 20 of elastic material. Such protective cover 20 is designed to be employed for the protection of tops of conventional cylindrical cans of the type having transverse end walls or tops and bottoms each circumscribed by a flared and raised double seam rim bead which projects both outwardly axially of the can and laterally thereof, and also securely to tie them together in a compact bundle to form a package thereof. Such shaped cover sheet 20 of elastic material may be, if desired, formed to advantage from elastic plastic sheet material, which may be a suitable thermoplastic material such as, for example, polyethylenes; polypropylenes; Vinylites, such as polyvinyl acetate, polyvinyl chloride, vinyl chloride-acetate copolymer, and polyvinyl butyral; Mylar, which is polyethylene terephthalate resin; etc. Such sheet stock may be shaped or contoured in any suitable manner, such as by male or female molding equipment under suitable conditions of elevated temperature at which it is soft and pliable enough to be distorted to contour, and the forming may be accomplished by vacuum or pressure shaping or by mechanical forming. For example, a sheet of a particular elastic plastic material may be extruded from conventional extruding equipment, illustrated at 21 in FIG. 4, to produce a continuous web or strip 22 thereof, and while it is still warm enough to be pressed to shape, perhaps at a temperature within the general range of about 250° F. to about 350° F., sections thereof may be shaped to provide the bosses and pockets of the cover member illustrated at 20 in FIGS. 1 and 2, such as by the recessed female vacuum or suction forming equipment illustrated at 23 in FIGS. 3 and 4. Thereafter, shaped cover member 20 is chilled or permitted to cool to retain its contoured shape, and, as will be understood from the following descriptions of various embodiments such pressure-shaped and set cover sheets are of limited flexibility and can be considered to be semi-rigid in a broad sense.

For example, let it be assumed that the extruding equipment 21 produces a continuously moving warm web 22 of elastic plastic sheet material which will be immediately drawn in between a pair of opposed vacuum shaping recessed female plates 24 and 25 constituting the equipment illustrated in FIG. 3. Although such forming equipment 23 may be moved longitudinally along with the moving web 22 it may be simpler to mount the opposed female forming plates 24 and 25 at a stationary station moveable only transversely toward and away from each other periodically to hold therebetween a section of the moving web 22 for the forming procedure, and then to free the formed or contoured section for travel therefrom as part of a continuous shaped web, such as in the direction indicated at 26 in FIG. 4, to be thereafter coiled up on a large drum, if desired, permitting later severance or die-cutting from the web of the shaped sections successively to produce protective cover members of the type illustrated at 20 in FIGS. 1 and 2. Since the web 22 is continuously extruded and it is desirable to effect the successive suction forming of sections thereof, a conventional web loop 27 may be provided, as is illustrated in FIG. 4, to permit step-by-step advance of a continuously extruded web through the forming or shaping equipment.

Figure 2:
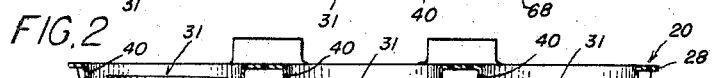
FIG. 2 is a sectional view taken substantially on line 2—2 of FIG. 1.

Let it be assumed that the embodiments of the protective cover member 20, illustrated in FIGS. 1 to 3 incl., 5 and 8 to 12 incl., consists of a main body sheet 28 of suitable plastic material which has sufficient elasticity to perform the gripping action hereinafter described and which may be, by way of example, of a thickness of about 0.020″ to about 0.010″. Although polyethylene is admirably suited to such service a water clear polypropylene may be preferred because of its transparency, sparkling clean appearance and unusual toughness. Assume also that it is desired that the section of the plastic web which is ultimately to form the cover member 20 of FIGS. 1 and 2 is to be shaped upside down, i.e., with its bottom face extending upwardly. Female mold or forming plate 25, which may be suitably mounted on support posts 29, 29, has provided therein a plurality of recesses 30—30, each adapted to form a shape by suction an imperforate boss or can-receptive pocket therein, such as those illustrated at 31—31 in FIGS. 1 and 2.

It will be understood from FIGS. 1 to 3 incl., 5 and 8 to 12 incl. that each boss or can-receptive pocket 31 preferably has a circular central area or portion 32 which, if desired, may be shaped generally complementary to a conventional transverse closing end of the can to be supported thereby. For example, as is illustrated in FIGS. 5 and 8 to 11 incl., a conventional cylindrical can, such as a beverage can 33, which may be of the twelve ounce size, has the usual cylindrical sidewall 34 and conventional upper end wall or top in the form of a transverse closing end disk 35 (centrally crowned, if desired) with the circular edge of the latter infolded about the end edge of the cylindrical sidewall in a double seam which defines a raised circular rim bead 36 that extends laterally outward, the bottom edge 37 thereof forming a circular abutment shoulder. The can-receptive boss or pocket 31 has its central portion 32 preferably slightly curved or bowed outwardly so as to accommodate the conventional central crowning of the can end wall 35. Circumscribed about the central portion 32 of the boss or can-receptive pocket 31 is provided a crowned zone or ridge 38 which is swelled laterally outward freely to receive the can rim bead 36.

In accordance with the invention a tensioned band of the sidewall of the can-receptive boss or pocket 31 is to be arranged about a circumambient, downwardly-extending, exterior sidewall zone 39 of the can which subtends the rim bead 36 and its abutment shoulder 37 in snug gripping engagement thereof. As will be best understood from FIG. 5, the can-receptive boss or pocket 31 has at its base adjacent the transverse main sheet body 28 a downwardly-extending, relatively thick, constricted, circumambient sidewall band 40, which, prior to application to a can top, is of appreciably less transverse dimensions or diameter than the can rim bead 36 and its abutment shoulder 37 and less in diameter than the can sidewall so that when it is snapped down over the bead below this abutment shoulder it is appreciably tensioned against the can sidewall zone 39 snugly and securely to grip the same. It will be seen from FIG. 5 that, since the laterally swelled crowned ridge 38 has an outer wall 41 which is appreciably greater in diameter than the can sidewall zone 39 as well as of the bead 36, that the constricted band 40 of the cover boss 31 turns laterally outward to convergence therewith, thereby providing an interior transverse abutment land or merging annular shoulder 42 on which the rim bead or its bottom edge 37 rests for support of the can by the cover sheet when the latter is grasped and lifted, as will be more fully understood with reference to the package of FIGS. 9 and 10 described hereinafter.

These and other characteristic features of the protective cover of the present invention will be more fully understood from the following description of a preferred method of suction forming the cover sheet illustrated in FIGS. 1 and 2 by apparatus proposed by way of example in FIGS. 3 and 4. As previously indicated, two opposed, recessed female molding or forming plates 24 and 25 may be used for this purpose. Such female mold plates 24 and 25 are to be moved periodically toward each other for effecting a shaping of a pliable section of sheet elastic material, such as a warm or heated film or sheet of elastic polyethylene, or the like, and then away from each other to free the molded sheet section. For this purpose, the mold plate 25 may be provided with a plurality of laterally-offset guide posts 43—43 slidably received in holes 44—44 extending transversely through mold plate 24 and with these holes, if desired, being suitably bushed by sleeves 45—45. With mold plate 25 suitably supported by bracket members or support posts 29, 29, mold plate 24 may be moved toward and away therefrom by means of a reciprocating rod or suspending post 46 to which it is fixed to be carried thereby. As will be seen from FIG. 4, such operating structure for reciprocating or moving top mold plate 24 up and down may be provided with suitable means for controlling suction lines leading to various recesses of both of the mold plates. Such control means may be in the form of a master control switch diagrammatically indicated at 47 in FIG. 4 having a trigger 48 engaged to be moved to switch-closing position by a trip 49 carried by the reciprocating rod 46 so as to close the circuit of suitable electrical equipment, such as a solenoid diagrammatically indicated at 50, to manipulate a valve 51 from a position of communication of a suction manifold 52 with a suction line 53 to a position communicating the manifold with the atmosphere.

As previously indicated, mold plate 25 is provided with suitable sockets or recesses 30—30 to form the plurality of can-receptive pockets 31—31 in the pliable elastic sheet web 22. As will be noted from FIG. 3, the central portion of each recesses 30, which is to shape the central area 32 of each boss or pocket 31, is communicated via a small duct 54, which may be about 0.02″ in diameter, with a tubular fitting 55 to which is attached one end of a suction conduit or line 56. Each recess 30 in mold plate 25 is provided annularly with an under cut V-shaped groove 57 below an annular cylindrical ledge 58, so that the pliable sheet stock will be drawn into this annular groove by suction to form the constricted gripping band 40 of each can-receptive boss or pocket 31. In order to pull and stretch the warm sheet of elastic material snugly into this groove 57 and about this ledge 58 of each recess 30, so as to form the swelled and crowned rim bead-receptive hollow ridge 38 and constricted gripping sidewall band 40 for each pocket, a plurality of relatively small ducts 59—59, 60—60 and 600—600, which may be of a size similar to that of ducts 54—54, are communicated respectively with the bottom of each V-shaped groove 57 and the top thereof immediately below each overhanging ledge 58 at a plurality of points circumambient of each recess 30. Such ducts are communicated therewith preferably at circumferentially-spaced points about forty-five degrees (45°) apart so that there are eight (8) such ducts for the bottom of the V-shaped groove and eight (8) for the outer side thereof. These suction ducts 59—59, 60—60, and 600—600 are suitably connected to the suction manifold 52 by any suitable conduits, such as lines 61—61 and 62—62, but it is to be understood that any other suitable means, such as a bustle and connecting tubes, or a closed annular chamber in the bottom side of the mold plate 25 connected to such ducts, with suitable suction lines communicated therewith, may be employed for this purpose.

As will be seen from FIG. 1, there may be provided adjacent the end margins 63, 63 of the main body sheet 28, arranged intermediate of the two rows of can-receptive bosses or pockets 31—31, a pair of relatively small, cupped, finger-engageable pockets 64, 64, which also extend upwardly. It will be seen from FIG. 3 that for the purpose of forming each such cupped, finger-engageable pocket 64 mold plate 25 is provided with a parabolic recess 65, the bottom of which is communicated with a suction line 66 by means of another small duct 67.

The cover sheet main body 28 is to be provided in medial areas thereof with main cupped, finger-engageable pockets 69, 69 which project in the opposite direction downwardly from the bottom side of the sheet. Accordingly, the top mold plate 24 is provided with a pair of suitable, relatively deep, cupped recesses 70, 70 which have rounded bottoms and with each communicated by a small duct 71 to a hollow fitting 72 to which a suction conduit or line 73 is anchored for connection to the suction manifold 52.

In operation of the equipment of FIGS. 3 and 4, let it be assumed that as a continuous warm web 22 of pliable elastic plastic sheet material is extruded from the nozzle of extruding equipment 21 it is fed between the female mold heads or plates 24 and 25, so that successive sections thereof can be shaped while warm to produce in each section the plurality of can-receptive bosses or pockets 31—31 and the end finger-engageable pockets 64, 64 extending downwardly from the bottom face of the sheet, and also to provide therein the pair of larger finger-engageable pockets 69, 69 extending upwardly from the top face of the web. The female mold plate 24 will be moved down by its suspending post 46 to clamp between it and the bottom female mold plate 25 such section of the web and air will be withdrawn from the various recesses 30—30; 65, 65; and 70, 70, by the manifold 52 and suction line 53 through valve 51 to draw areas of the warm web into these recesses. Since this suction forming action is being performed on a section of the extruded web 22 without severance therefrom it is understood that the web must freely pass between the female molding plates 24 and 25 and thus guides, such as posts 43—43 carried by the bottom female molding plate, and the receptive holes 44—44 in the top female molding plate, must be offset laterally from the marginal side edges of the web so as not to interfere with the free passage of the latter between successive clamping and suction operations.

When suction is applied to the warm web of elastic plastic material, as a section threeof is clamped between the female mold plates 24 and 25, areas thereof are drawn down into the recesses 30—30 shallowly to cup the central areas 32—32 of the can-receptive bosses or pockets 31—31 and to shape annularly thereabout circular, laterally swelled crowned ridges 38—38. The thickness of the sheet material will not be appreciably reduced as it is drawn about the overhanging cylindrical ledge 58 at the base of each recess, so as to assure a relatively thick sidewall band 40 to which appreciable tension may be applied when it is snapped down over the can rim bead 36 and about the can sidewall zone 39 subtending the latter, for snug and gripping engagement of this sidewall zone upon elastic recovery.

As the elastic sheet material of the main sheet body 28 is sucked into the cupped recesses 65, 65 and 70, 70, respectively to form the cupped pockets 64, 64 and 69, 69, the tips thereof are thinned out to appreciable flexibility and to a degree which might permit ready puncture thereof when one forcibly inserts his finger therein. Accordingly, there is no limitation thereby to the extent one may insert one of his fingers and his thumb in the carrying pockets 69, 69, permitting the ends thereof to be thrust through and hooked toward each other for secure suspension of the cover 20 and its load of cans 33—33. Incidentally, it will be noted that the medial pockets 69, 69 are of a diameter appreciably greater than the diameter of the end pockets 64, 64 so as to facilitate such appreciable insertion of one's finger and thumb, the smaller pockets being primarily provided for finger tip engagement to facilitate can removal, as will be explained later in connection with FIG. 12. However, it is preferred that after cover 20 is formed the top ends or tips of pockets 64, 64 and 69, 69 be cut away, such as by suitable die cutting, to convert them to finger-receptive sleeves.

Upon separation of the female mold plates 24 and 25 by lift of the former relative to the latter upon raise of suspending post 46, sufficient space will be provided therebetween to permit freeing of the can-receptive pockets 31—31 and the finger tip engaging pockets 64, 64 from the bottom plate as well as the thumb and finger engaging pockets 69, 69 from the top plate. Actually the latter will tend to be pulled out of their forming recesses 70, 70 in the top female mold plate 24 due to the undercutting below the circular ledges 58—58 in the bottom female mold plate 25 upon separation of these plates, and the formed cover section can then be readily stripped out of the bottom mold plate by lift due to the elasticity and flexibility of the elastic plastic sheet material. This stripping is facilitated by the shrinkage of the material attendant upon cooling thereof which is speeded by heat transfer to the metal of the female mold plates which can be jacketed and water-cooled, if desired. It may be desired after forming successive sections in the continuous web 22 to withdraw the resulting continuous web 26 to a large diameter storage drum about which it may be wrapped, permitting thereafter the contoured web to be withdrawn at a convenient time and die cut into separate cover members, such as that illustrated at 20 in FIGS. 1 and 2. However, it is possible to provide one of the female mold plates 24 and 25 with a generally rectangular sheet-severing die blade to separate the molded section from the web as the molding operation is performed, permitting stripping upon separation of the plates of each shaped and separated cover sheet in any suitable manner. After stripping cover 20 from the mold plates 24 and 25 the tips of the pockets 64, 64 and 69, 69 may be cut out or off by a suitable die cutting operation to convert them into finger-receptive sleeves shown in FIGS. 1, 2, 8, 9, 10 and 12.

It will now be understood that in order to apply the protective cover 20 to a bundle of cans the gripping band 40 of each can-receptive pocket 31 must be sufficiently stretched to permit it to be pulled down over the rim bead 36 of each can top. For this purpose, a pair of companion clamping plates 74 and 75 may be provided which are respectively shown in plan view in FIGS. 6 and 7. Clamping plate 74 has a plurality of circular holes 76—76 therein, each of which is of a diameter at least equal to the outer diameter of the can rim bead 36 plus twice the thickness of the sheet stock in each of the can gripping bands 40, preferably being of a diameter readily to receive the formed can-receptive pocket 31 without undue deformation of the outer wall 41 of its crowned ridge, as will be understood from FIG. 8. Notches 77, 77 are provided in the marginal edges of clamping plate 74 to accommodate the relatively small finger tip-engaging sleeves 64, 64. Clamping plate 75 is similarly provided with a plurality of circular holes 76—76 to permit like reception of the can-receptive pockets 31—31 and it is also provided in medial areas with circular holes 78, 78 for free reception of the finger and thumb engageable sleeves 69, 69. It will be understood from FIG. 8 that the bottom clamping plate 75 may be dropped down over a group of the cans 33—33 or the bottoms of the latter rested in the holes 76—76 thereof. Then a protective cover 20 may be placed loosely over the tops of the cans 33—33 and top clamping plate 74 brought down thereover to rest upon the main body sheet 28 marginally or circumambient of the can-receptive pockets 31—31, i.e., from the full line position shown in FIG. 8 down toward the dot-dash position 174 indicated therein. The bottom clamping plate 75 will be raised up past its dot-dash position 175 so as to clamp between these plates areas of the main sheet body 28. Then both clamping plates 74 and 75 will be lowered together to their dot-dash positions 174 and 175 so as to snap the can-receptive pockets 31—31 down over the can tops to snug engagement of the bands 40—40 about zones 39—39 of the can sidewalls subtending their rim beads 36—36. It is important to provide such secure gripping of at least the annular zone of the main sheet body 28 surrounding each of the can-receptive pockets 31 and its constricted band 40 as the latter are stretched down over the can tops in order to prevent improper seating of any can top in its can-receptive pocket, which is possible due to the elasticity and flexibility of the pocket and cover sheet.

It will be seen from FIGS. 9, 10 and 11 that, as a result, a protective package of a plurality or bundle of cylindrical cans of the rim bead type, identified as a whole therein by the numeral 80, is readily produced in the described manner. Sides of the six cans 33—33 in each of the two rows thereof and also in the opposite two rows are located fairly closely to each other and it will be seen from FIG. 9 that the resulting package 80 is attractive.

As is pictorially illustrated in FIG. 10, such a package of cans 80 may be readily transported by thrusting the tips of a finger 81 and the thumb 82 of a person's hand, diagrammatically depicted therein at 83, into the respective sleeves 69, 69, to a depth sufficient to permit the tips of the finger and thumb to be turned or hooked inwardly toward each other for secure gripping or grasp of the cover 20. The flexible side walls of the finger-engageable sleeves 69, 69 provide extended conforming bearing surfaces to assure comfort in such grasp of the package. Each can 33 is held securely gripped in its can-receptive pocket 31 to be suspended by the protective cover 20, for transportation of the bundle of cans by the cover as a complete package. It will also be noted from FIG. 10 that crowding or snugging of adjacent cans toward each other is permitted by slight flexure of the cover sheet 20 as it is grasped in the described manner and this prevents any undue rattling during hand transportation. It is also to be understood that the resultant package 80 may be bodily immersed in cooling media, such as ice water, without danger of the package falling apart since the plastic cover is non-hygroscopic and does not tend to stretch under conditions of lower temperatures.

As is illustrated in FIG. 11, one of the cans 33 of package 80 may be readily snapped out of or stripped from its gripping and suspending can-receptive pocket 31, such as by levering as pictorially indicated therein. For example, one may rest the bottoms of the cans 33—33 of the package 80 upon a flat surface and hold it securely in position by resting one of his hands 83 over a portion of the protective cover 20 thereof. He may then grasp with his other hand 84 one of the cans 33 and lever its bottom end out and upward in the depicted manner to snap its top end out of the pocket 31 telescoped thereover. The remaining cans 33—33 may be successively removed in a similar manner.

Although the present invention will find a ready market in the packaging and distribution of canned beverages of the type in which the cans may be of relatively small sizes, of the order of eight and twelve ounce capacities, it is to be understood that it may be advantageously used in the distribution and marketing of various canned goods.

It is of importance that the protective cover 20 of the package of the present invention assures that sanitary conditions of can tops are maintained to a practical degree. Collection of foreign matter, dirt and dust on the can tops is prevented by the impervious covers thereof provided by the can-respective pockets. Conseqeuntly, the tops of the cans are kept sufficiently clean as to prevent undue contaminating of contents of the cans when they are opened, and to permit the practice of a prevalent habit of puncturing holes in the can tops, applying the lips to one of the holes and consuming the contents directly therefrom requiring preliminary wiping thereof. Incidentally the degree of sanitary condition maintained by such protective cover is superior to the cleanliness attained by the inefficient and perfunctory wiping that is usually performed by one preliminary to opening a can, and who may intend to consume the contents directly from the can in such fashion. It is to be understood that attainment of such protective advantages is not confined to practice of the invention by a cover member which has a plurality of can-receptive pockets formed therein, the cover being of advantageous service in separate single pocket units, each adapted protectively to cover only a single can. Also such single can covers or a six-can covering section of a plural can cover of the present invention will effectively serve as a recapping device should only part of the contents of a can be removed after opening. It is a simple matter to scissor or cut out a corner of the cover sheet 20 to serve as such a single can recapping device since such relatively thin elastic plastic sheet stock can be readily severed by scissors or knife, or the cover may be provided initially with break-away lines about the can-receptive pockets 31—31 so that each may be torn readily away therefrom to form a single can cover, as is explained later in connection with FIG. 34.

It will be seen from FIGS. 9, 10 and 11 that each can-receptive pocket 31 is circumscribed by an annular crowned ridge 38, forming a part thereof, which is substantially triangular in radial section, as will be readily understood from FIG. 8. This crowned ridge 38 facilitates stacking of the packages 80 in stores, and other distribution centers, since the crowned ridges of the protective cover of one package will nest securely in the recessed bottom end closures of the cans of the package superposed thereon, such bottom end closures also being circumscribed by projecting rim beads. The adjacent positioning and arrangement of the cans of the preferred form the package illustrated in FIGS. 9 to 11 inclusive also facilitates appreciably such stacking.

It has been found that certain advantages may be obtained by providing the protective cover of the package of the present invention in a form so as to have appreciable stiffness or rigidity. This may be attained, for example, by selecting a plastic material which while having the necessary degree of elasticity is of the desired stiffness, and also by employing for the cover sheet a web of material which is of relatively heavy thickness. For example, as is illustrated in FIG. 12, if the sheet body of protective cover 100 constituting part of package 180, there identified by the numeral 208, of the package 180, is of appreciable rigidity the plurality of cans 33—33 may be securely held in the cover receptive pockets 31—31 even should the package be suspended from one end thereof, such as by insertion of a person's finger, illustrated at 81, through one of the end sleeves 64. As is illustrated in FIG. 12, the levering weight of the cans 33—33, particularly when they are of relatively small size and capacity, will have a minimum tendency unduly to bow the cover sheet body 208 so that the cans remain grouped sufficiently to avoid unsightly package distortion. Incidentally, it will be noted from FIG. 12 that the finger-engageable sleeve means which is provided in medial areas of the main sheet body 208, intervening four of the can-respective pockets 31—31, may each be in the form of an upwardly-extending, open-end tubular member 69, provided in such form in the production of the protective cover. The protective cover of such a package may be purposely rigidized by structural formation and embossment to assure attainment of such an end, and such form of the protective cover may likewise facilitate the stacking of the packages, as will be understood from the following description of the embodiment illustrated in FIGS. 13 to 26 inclusive.

The embodiment of the protective cover which is illustrated in FIGS. 13, 14, 15, 17, 18, 21, 24 and 26 is desirably in the form of a flat pallet or platform 200 having the can-receptive pocket portions 231—231 thereof arranged in and extending to and from top and bottom planes which, desirably, are substantially parallel. The intervening sheet areas form lateral connecting web areas retained in an intermediate plane with side walls of the finger-receptive sleeves extending from or in the vicinity of the bottom plane to intermediate planes. Such substantially flat protective covers 200 are so contoured that shaped projections of one do not tend to nest into recesses in another superposed thereon, thereby avoiding any tendency to stick together when stacked for compact transportion, storage and handling before application to can tops. As will be apparent hereinafter closely spaced top portions of contoured areas which define the can-receptive pockets 231—231 of protective cover 200 are arranged in a pallet or platform plane, i.e., the top plane, and the other portions depend therefrom or are depressed, either down to the bottom plane or to one or more intermediate planes. Except for relatively small open finger-engageable sleeves and channels there-surrounding the major pallet area has defined therein only relatively small depressed areas intervening rigidizing or stiffening embossments and a plurality of relatively large annular channels into which the circular rim beads of bottoms of cans of a superposed package or coaster or tray structure into which they may be seated may readily nest. As a result, sliding of the bottoms of cans of one package or a bottom tray structure thereof over the protective cover of a package therebelow is facilitated, until the rim beads of the bottoms of the cans of the superposed package, uncovered or covered by contoured tray sheet structure, reach these relatively large annular channels into which they will then readily drop for secure nesting. The central circular portions of the can top-receptive pockets 231—231 in the cover structure 200 may be slightly depressed to provide within circular marginal raised ridges thereof shallow cups in which a depressed circular coaster area of a can bottom-receptive pocket of a bottom tray structure may readily seat or nest slightly for attaining similar aligned stacking of packages in simple and assured manner.

The forming operation to produce cover 200 may depress from the top pallet plane, indicated at 85 in FIG. 14, to the bottom plane, indicated at 86 therein, a plurality of circular channels 87—87, each of which describes and circumscribes one of a plurality of the can-receptive pockets 231—231 having an annular raised ridge 238 described about a central circular portion or area 232. For the purpose of rigidizing these central circular areas 232—232 of the can-receptive pockets 231—231, they are provided with suitable embossments which may be of any desired configuration featured by raised portions substantially in the top pallet plane intervened by relatively narrow grooves or depressions extending down to an intermediate plane or a convexed area complementary to the conventional crowned can end wall. Such embossments may be in the form of a plurality of corrugated ridges 88—88 extending across between the circular margin of a small central depressed area 90 and the inner side of the circular ridge 238 and completely across from one portion of the latter to another laterally of area 90 and defining therebetween relatively narrow depressed grooves 89—89, the bottoms of which preferably are convexed to be complementary to a crowned or spherical surface to accommodate the crowned can end wall. Within such corrugated central areas 232—232 there may be defined, if desired, depressed configurations other than such small central circular areas 90—90, which may be in the form of advertising indicia or patterns and, if desired, with the bottom portions of such depressed configurations also complementary to a convexed surface as may be understood from FIG. 21. Such embodiments, all of which have their top portions located near or in the top pallet plane, suitably stiffen these areas.

Preferably the main sheet body 228 of protective cover 200 is substantially rectangular having end edges 263, 263 and side edges 268, 268, with rounded intervening corners all terminating in a marginal lateral flange 91 disposed in the intermediate plane. It will be apparent from FIG. 13 that portions of the annular channels 87—87 merge at points of adjacency intervening the can-receptive pockets 231—231 and outwardly of the latter define them from the marginal lateral flange 91.

It will also be seen from FIG. 13 that each of a pair of medially located finger-engageable sleeve means 269, 269 intervene and are surrounded by the annular channels 87—87 of a cluster of four of the can-receptive pockets so that the root area of each at the bottom plane 86 is in the form of a four-pointed star with the side edges thereof concaved and defined by arcs of circles which describe the outward walls of channels 87—87. The side walls 92, 92 of the finger-engageable sleeves 269, 269 slope gradually upwardly from their roots at the bottom plane 86 to mergence with top circular portions of these sleeves, as will be understood from FIGS. 13 and 17, to provide a smooth curved and flared bearing surface defined by the inner face of the side wall of each when a finger tip is inserted therein and crooked or hooked inwardly for lift of the package. The circular top end of each sleeve 269 preferably terminates in an intermediate plane 93, as will be seen from FIGS. 17 and 29, in order to avoid formation of a sharp edge in this plane at the top of each finger-engageable sleeve, the side wall of the pocket from which it is to be formed is reverted inwardly, as indicated at 94, the circular end wall 95 of this pocket which extends substantially parallel to the platform plane 85 being readily removable by die-cutting along a circular line, margins of which are indicated by dotted lines 96 in FIG. 17.

A pair of end finger-engageable sleeve means 264, 264 preferably are provided adjacent the marginal flange 91 at the ends 263, 263 intervening the adjacent can-respective pockets 231, 231 thereat and preferably these are generally triangular in cross-section rather than circular, as in the first embodiment, in order to provide larger openings in the limited spaces available, but, of course, they may be of any desired cross-sectional shape. As will be understood from FIGS. 13, 18 and 29, each end finger-engageable sleeve 264 is defined on the outer side by a depressed channel 97 extending downwardly from intermediate plane 98 in which the marginal flange 91 is located to a lower intermediate plane 99 and on the inward side by a sloping curved wall 100 with side walls of the latter and sides of the sleeve described along arcuate curves defined by the circles along which the outer side walls of the annular channels 87, 87 are disposed.

The protective cover 200 of FIGS. 13 and 14 may be readily formed in contour against a single recessed female or cavity suction mold structure, such as that indicated at 225 in FIG. 15, following procedure similar to that described above in connection with the forming operation of female mold plate 25. For this purpose, female mold structure 225 is provided with a manifold chamber 102 by a back plate 103 and suitable marginal spacing and sealing means, such as that indicated in FIG. 15 at 104, with a suction conduit or line 105 communicated with this manifold chamber. Main body 106 of female mold structure 225 preferably is in the form of a flat plate having a plurality of circular holes therein, one for each of the can-receptive pockets 231 to be formed thereby. Each circular hole preferably is counterbored to define an annular, inwardly-extending ledge 258 and an annular undercut therebelow. Each circular hole in plate 106 preferably is additionally counterbored at its bottom end, such as at 107, to provide an annular recess. Into each counterbored circular hole in plate 106 is seated a circular insert 108 having a cylindrical sidewall 109 of a diameter a few thousandths of an inch less than the internal diameter of the cylindrical sidewall 110 of a counterbored section of the circular hole provided by the counterbore undercutting thereof, so as to define therebetween an annular orifice 111 when insert 108 is concentrically arranged in the circular counterbored hole. As will be seen from FIG. 16, insert 108 has at its base a circular, laterally-extending flange 112, which seats snugly in the circular recess 107 and communication between manifold chamber 102 and the annular orifice 111 is provided, such as by means of a plurality of notches 113 therein. The circular insert 108 is provided at its top end with an annular lateral edge 114 which together with the under side of annular ledge 258 and a portion of cylindrical sidewall 110 defines an interior annular groove 257 to which the annular orifice 111 communicates.

Each circular mold insert 108 also has its top end contoured to shape the top central portion 232 of each can-receptive pocket 231, and for this purpose is provided, radially inward of the top edge 114, with an annular V-shaped groove 115 across from opposite sides of which extend parallel ribs 116—116 intervened by parallel grooves 117—117. Thus, when the sheet body 228 is drawn by suction down against the grooved top of insert 108 the top of the can-receptive pocket 231 will be formed to shape with its central circular area 232 embossed or corrugated thereby. As will be best understood from FIGS. 15, 16 and 20 to 23 incl., the central area 232 of each can-receptive pocket 231 preferably is provided with the previously mentioned depressed central circular area 90 which may be left plain, i.e., free from embossment, or provided with embossed indicia, as may be desired, and for this purpose the central portion of the top end of each mold insert 108 is provided with a circular depressed area 119 flanked by the ribs 116—116 and intervening grooves 117—117 over and into which the rib embossment of the central area of each can-receptive pocket of the cover 200 is formed. Since many conventional cylindrical cans which have raised and laterally-projecting rim beads at their top and bottom ends are provided with crowned or convexed top end walls preferably the embossed central area 232 of each can-receptive pocket 231 is shaped so that lower or inner surfaces thereof will be disposed complementary to such convexed surface. Accordingly, it will be noted that the central depressed area 90 is disposed laterally in a plane intervening the top edges of the corrugation ribs 88—88 and the deepest portions of the intervening grooves 89—89 immediately adjacent the raised circular ridge 238 and that the bottoms of these cover grooves are curved upwardly as they extend toward the center or the circular central area 90. Such shaping is illustrated in FIG. 15 by exaggeration to assure an understanding thereof. Suitable suction ducts or holes, such as those indicated at 118—118, are provided which lead to all depressed areas in the top end of each mold insert 108 to produce such shaping and embossing in the suction molding of the warm sheet body from which the cover 200 is molded.

Outward the side wall of each can-receptive pocket 231, the outer side wall of the channel 87 circumscribed thereabout is defined by a vertical wall 120 of a groove or channel 121 in mold plate 106 with suitable suction ducts 1180—1180 leading thereto to draw the material of the body sheet 228 thereinto and define the marginal portions of the cover 200 which constitute the marginal lateral flange 91. It will be understood that similar mold structure may be employed to form each of the pockets which is to be converted to one of the finger-engageable sleeves 269, 269 and 264, 264 when the top end thereof is cut or died out, and to produce the wall-defined channels 97, 97 for the latter sleeves.

In order to produce the protective cover 200 of FIGS. 13 and 14, a pliable sheet or web 228 of elastic material, such as a warm sheet of polypropylene, will be laid over the top of female cavity mold structure 225 to cover the recesses therein. When air is exhausted from manifold chamber 102 by suction through conduit 105 air is drawn down through the annular orifice 111 and the ducts 118—118 and 1180—1180 to suck areas of the pliable sheet or web down into the mold recesses, snugging the stock thereof to the sidewalls of the recesses. As a result, the elastic plastic sheet material is drawn into the annular mold groove 257 to define in the sidewall of can-receptive pocket 231 being formed an interior annular groove 241. Above the interior annular groove 241 the sidewall of each can-receptive pocket 231 is drawn tightly about the over-hanging annular ledge 258 to define a constricted band 240 having a substantially vertical sidewall of appreciable width and of a diameter less than the diameter of the can sidewall zone 39. The mold groove 257 is of such internal diameter as to form the interior groove 241 in the can-receptive pocket sidewall in a diameter less than the external diameter of the can rim bead 36. Also the width of the interior groove 241 in the can-receptive pocket side wall preferably may be less than the height of the can rim bead 36. Consequently, when the top of a can 33 is socketed in one of the can-receptive cover pockets 231 with the can rim bead 36 snapped into the interior groove 241, the sheet material in at least the vertical wall of the latter will be stretched tightly about the exterior side surface of the can rim bead to provide a gasket-tight, practically germ-proof seal thereat subtended by a circular shoulder or land 242 on which the bottom edge 37 of the can bead rim seats, and with the annular vertical band 240 at the base of the can-receptive pocket 231 tensioned about the can sidewall zone 39. Thus it will be understood that the upper end of the annular band 240 and the bottom side of the interior groove 241 are integrally connected by the merging lateral annular shoulder 242 in each can-receptive pocket 231, on which the can rim bead 36 is supported securely when the resultant package of a bundle of the cans 33 tightly gripped by the common cover 200 is lifted by grasp of the latter. By making the width of the interior groove 241 in the can-receptive pocket sidewall less than the height of the can rim bead 36, such gasket-tight and practically germ-proof seal at the can rim bead is enhanced, assuring that the sheet material is tautly snugged not only to the exterior side surface of the can rim bead but also to the top and bottom edges thereof.

It will thus be seen that recessed female suction mold structure, such as that proposed in FIGS. 15 and 16 may be easily and simply employed to shape pliable sections of an elastic plastic sheet or web which when lifted or stripped from the mold may then subsequently at any desired time be die-cut successively to produce a plurality of protective covers, such as that indicated at 200 in FIGS. 13 and 14. The die for cutting of each section will be provided with suitable blades to cut out the ends of the pockets which are to serve as open-end finger-engageable sleeves 269, 269 and 264, 264. Simultaneously, blades of the die will cut along marginal edges to define the end edges 263, 263 and side edges 268, 268, the location of a portion of such a marginal severance being indicated by the dotted line 122 in FIG. 15. Such a die may be associated with the female mold structure 225 so as to perform such severance immediately after such suction contouring of a section of the web, employing portions of the mold plate 106 as the die bed. It will be understood that such die-cutting forms the marginal flange 91 which incidentally may be advantageous since it avoids providing a sharp marginal edge in the pallet plane.

In some embodiments of the present invention it may be desired to enhance the effectiveness of the platform effect provided by the top portions of the corrugations formed in the pliable plastic cover sheet, and for this purpose mold ribs or ridges over which the corrugated ridges are formed may be provided with flat tops which may be radiused slightly at their edges, and the resulting corrugated ridges in the sheet may have flat top portions which are about one-sixteenth of an inch (1/16") in width. The grooves intervening the mold ridges may also be provided with flat bottoms for a similar purpose. The depth of the corrugation grooves in the central circular areas of the can-receptive pockets may be provided with an overall height of about five thirty-secondths of an inch (5/32") since, in nesting the recessed bottom of a can over each, it may be desired to compress such corrugations in portions of the space intervening the superposed can bottom and the can top socketed in the can-receptive pocket, such recesses within the rim beads conventionally being about one-sixteenth of an inch (1/16") in depth.

The protective cover sheet 200, illustrated in FIGS. 13 and 14, can readily be applied to the tops of a bundle of cylindrical cans by simple equipment. Such equipment may be in the form of a pressing structure 274, portions of which are illustrated in FIGS. 19, 20 and 21. Such applying or pressing structure 274 conveniently may comprise a flat plate 123 having cut into one face thereof a plurality of circular grooves 124—124 in each of which is nested a base end edge of a rigid cylindrical flange or ring 125, and it will be noted from FIGS. 19 and 20 that each of these pressing flanges 125 may have a thickened base, if desired. Each cylindrical rigid pressing flange 125 is of an internal diameter greater than the diameter of the can rim bead 36, being at least in diameter a dimension equal to the external diameter of the rim bead plus twice the thickness of the cover sheet stock. The bottom or free circular end 126 of each rigid pressing flange 125 preferably has its inside edge appreciably radiused or chamfered off, such as is indicated at 127 in FIG. 20, since as will be explained later, the sheet stock in the bottom of each annular channel 87 will be drawn thereabout to a degree in the application of the protective cover 200 to the bundle of cans 33—33. As distinguished therefrom, the outside edge of the bottom end of each cylindrical pressing flange 125 provides a substantially square corner where the bottom end surface and the cylindrical outer side surface meet in order to preserve an annular outside vertical sidewall zone 128 at the bottom end of each pressing flange, as will be seen in FIG. 21. Incidentally, at the localities where outside surfaces of the rigid pressing flanges 125—125 are juxtaposed, such as at 129 indicated in FIGS. 19 and 20, portion of their outer surfaces are flatted off for abutment to assure that the thickness of the two walls of these abutted flanges at each such locality will be appreciably less than the width of the adjacent depressed channels 87, 87 where they are merged, as will be understood from FIG. 20, so that there will be free reception of the lapped portions of the walls of the rigid pressing flanges in the merged channels.

As will be best understood from FIGS. 13 and 21, the radially outer wall of each depressed channel 87 at its root will have a substantially vertical zone 130 at all points of adjacency to upwardly extending portions of the cover sheet, such as at the inner terminal margin of the marginal flange 91, and side wall portions of the finger-engageable sleeves 269, 269 and 264, 264. There will thus be provided at most points about the can-receptive pockets 231—231, except where they come close together with mergence at the latter localities of their circumambient depressed channels 87—87, arcuate substantially vertical portions of cover sheet walls which define the outer sides of the annular depressed channels circumscribed about these can-receptive pockets, with these portions which are arranged about any one of the pockets being disposed along a circle of certain diameter. This circle is of less diameter than the outer diameter of each pressing flange bottom end 126. Thus, diametrically across any one of the can-receptive pockets 231, these substantially vertical portions in zones 130—130 are spaced a distance less than the outer diameter of the pressing flange zone 128. Consequently, when protective cover 200 is mounted on the pressing and applying structure 123, the sheet stock or web is stretched tautly about the base of each such pocket 231 by forcing the bottom ends 126—126 of the cylindrical or ring flanges 125—125 into the depressed channels 87—87. Such taut anchorage of the sheet stock in the bottoms of the depressed annular channels 87—87 prevents undue inward creeping of the cover sheet material at the margins of the can-receptive pockets 231—231 as they are forced down over the can tops. There is no such anchorage at the points where the depressed channels 87—87 for separate and adjacent can-receptive pockets 231—231 merge but at these points equal and opposite forces are created across the can-receptive pockets to anchorage at the outside wall portions of the channels about the pockets at the ends of the transverse end longitudinal rows thereof. As is indicated in FIG. 20, the bottom of the merged portions of any adjacent pair of channels 87, 87 is bowed downwardly to tautness as it is forced down between adjacent can beads 36, 36, so as to transfer tension across to such points of anchorage.

Let it be assumed that the protective cover 200 of FIGS. 13 and 14 is forced on to the bottom ends 126—126 of cylindrical rigid pressing flanges 125—125 of pressing and applying structure 123 to nesting of their ends in the depressed annular channels 87—87, as indicated in FIG. 20. A bundle of six cans will be arranged upright on a solid lateral surface with their axes suitably aligned with the axes of the can-receptive pockets 231—231, such as by being seated in circular recesses in a base plate or jig. Pressing structure 123 is then lowered to telescope the bottom ends 126—126 of the rigid flanges 125—125 down over the rim beads 36—36 of the cans 33—33, so as to stretch the constricted bands 240—240 of the can-receptive pockets 231—231 to snug engagements therebelow and about the can side wall zones 39—39. Frictional engagement between substantially vertical portions of each pressing structure rigid flange 125 at the bottom end 126 thereof, in its zone 128, and the juxtaposed substantially vertical wall portions 130—130 of the protective cover sheet stock which define with each can-receptive pocket side wall a circumambient depressed channel, is of less strength than the frictional engagement between can surfaces and interior surfaces of the side wall of each can-receptive pocket 231 at the tensioned constricted band 240 and the bead-receiving interior groove 241. Consequently, after the plurality of pressing cylindrical flanges or rings 125—125 have been lowered over the tops of the cans 33—33 to push the can-receptive pockets 231—231 of the protective cover 200 down over the can tops to snap the tensioned constricted band 240 of each about the can side wall zone 39 and the side walls of the interior pocket groove 241 of each about the can rim bead 36, retraction or lift of the pressing flanges or rings will strip the bottom ends 126—126 thereof from out of the channels 87—87, leaving the can tops securely socketed in the can-receptive pockets to complete the package 280 of a bundle of cans having their top ends covered by and anchored to the protective cover. The top ends of the cans 33—33 will be so securely held in the pockets 231—231 of the protective cover 200 as to permit rough handling of the package 280 in storing, stacking, transportation, etc., thereof without danger of any of the cans dropping free. However, the anchorage of the tops of the cans 33—33 to the protective cover 200 is of a nature so that levering out of a pocket of the can socketed therein, such as in the manner proposed in FIG. 11, is simple and readily practiced.

The top portion 232 of each can receptive pocket 231 remains tautly stretched across each can top end after the fashion of the stretching to tautness of a drum head with secure anchorage thereof all around by the can rim bead 36 which is seated in the annular cover groove 241. This taut stretching of the top portion 232 of each can-receptive pocket 231 supplements the seal of the can rim bead in the annular cover groove 241 produced by virtue of the fact that initially the diameter of this groove is less than the outer diameter of the bead and preferably the groove width is less than the bead height, so that the sheet stock in the walls of the groove are stretched to snug engagement of the juxtaposed surfaces of the bead. This assures a sanitary and practically germ-proof gasket-tight seal at the can rim bead which has been found in practice to be so effective as to maintain for weeks in the pocket head above the can top end a body of sterile air trapped therein under above normal atmospheric pressure by the cover-applying procedure. This trapping of a pressurized head of air is apparent from the upward bulging of the tightly stretched top portion 232 of the can-receptive pocket 231 and, although after an extended storage period, the differential in the pressure of the trapped air head and the lower surrounding atmospheric pressure causes slow bleed out of some of the trapped air until a nearer balance of these pressures is attained with attendant collapse of the bulged pocket top substantially to the platform or pallet top plane there is no opportunity for reverse fluid transfer into the head space to carry thereinto contaminating material and germs. A sterile head of air remains entrapped above each can top which converts the flexible top of the can-covering pocket into a gas bag type of shock absorber that protects the can from physical damage in handling and shipping, and minimizes the metallic and bumping contact sounds of the type typical of metal cans striking against each other and rattling against walls of storage containers.

It has been made clear that the resulting package 280 features a protective cover in which top portions of the contours of the latter are all substantially disposed in a pallet or platform plane in which is defined depressed circular channels readily receptive of rim beads of can bottoms of a superposed package when slid thereover to alignment for nesting. Thus a plurality of packages of the present invention, such as that illustrated at 280, may be readily stacked in neat alignment as will be seen from FIGS. 22 and 23. The transverse circular bottom 235 of each can 33 in such a package and the bottom rim bead 236 circumscribed thereabout define a can bottom recess 2350 into which the corrugated central area 232 of each can-receptive pocket 231 of cover 200 of the lower package readily seats, with nesting of the annular ridge 238 of this pocket within the can bottom rim bead 236 of the superposed package, as will be best understood from FIG. 23. As a result, the corrugated ribs 88—88 of the central circular area of each can-receptive pocket 231 of the lower package will be confined in the chamber defined by the opposed top and bottom rim beads 36 and 236 and consisting of the opposed can top and bottom recesses 350 and 2350. The top portion 232 of the can-receptive pocket mounted on the lower can and the air head trapped therebeneath provides an effective intervening cushioning effect and rattle eliminating means.

In practice of the present invention, it may be desirable to tie the six cans of a pack bundle thereof more securely together than is attained by the application of cover sheet 200 to the top ends thereof and in doing so to attain further advantages. As will be understood from FIGS. 24 to 31 incl., such a result may be accomplished by making provision for covering simultaneously the top ends of all twenty-four cans of a carton lot of two dozen thereof, illustrated by way of example at 480 in FIG. 24. It will be noted from FIG. 24 that a cover sheet for all twenty-four cans may comprise four separable sections, each constituting a protective cover of the type illustrated at 200 in preceding figures. Each quarter section protective cover 200 in such embodiment will have one end and one side thereof connected to an end and side of adjacent like quarter section covers 200, 200 with the end connections at 131, 131 being defined by perforated or breakaway lines of weakening. Similarly, the side connection at 132, 132 of adjacent quarter section covers 200—200 are by means of perforated or breakaway lines of weakening. Thus the four quarter section covers 200—200 are readily separable from each other manually so as to subdivide the carton lot of twenty-four cans into four six-can packs.

Preferably a tray structure is provided for the bottom ends of the twenty-four cans in the carton lot, an embodiment of which is illustrated at 1480 by way of example in FIG. 25. As will be seen therefrom, the tray structure 1480 is subdivided into substantially like four quarter sections 1380—1380 each consisting of six similar, generally circular coasters 133—133. The structural details of each coaster 133 will be explained later in connection with other figures of the drawings but it is to be understood that it is intended they be formed from sheet material similar to that employed for the production of the protective covers of the present invention, such as elastic plastic sheet stock having limited flexibility, e.g., polypropylene sheet, and may be contoured or formed in similar fashion, such as on a cavity suction mold. It will be noted from FIG. 25 that the adjacent trays 133—133 in each quarter section 1380 are connected at juxtaposed points by perforated or breakaway weakened lines of connection 134—134 while weaker lines of connection 135—135 are employed between the trays of one quarter section group and the adjacent ones of another quarter section group. This assures that when a twenty-four can carton lot is to be broken up or subdivided into four six can packs, the manual pressure applied will break away from the tray structure 1480 a quarter section 1380 of the trays 133—133 with the six of the latter therein remaining interconnected. Each generally circular tray 133 will be in the form of a shallow cup or can-receptive pocket having a circular central portion 136 circumscribed by an upstanding circular side wall 137 provided with a lateral outwardly-extending marginal flange 138. For a purpose to be explained later, the side wall 137 of each tray 133 is provided in the inner face thereof with a plurality of drain grooves 139—139 which may be in any desired number.

As will be best understood from FIGS. 27, 28 and 30, the upstanding side wall 137 is provided with an annular internal groove 140 formed therein for snug reception of the bottom can rim bead 236 in a manner similar to reception of the top can rim bead 36 in the annular groove 241 of protective cover pocket 231, each downwardly extending drain groove 139 is defined in the inner face of the upstanding side wall 137 to a radial depth outwardly beyond the annular bead-receptive groove 140 and the bottom end thereof is defined in an outer zone of the transverse central coaster bottom area 136 so as to provide a free passage for fluid, such as water, down past the bottom can rim bead 236 and its receptive tray groove 140 and beneath this rim bead to communication with chamber 2350 defined between the can bottom end wall 235 and the tray coaster transverse central portion 136, as will be seen from FIG. 30. At the juncture of the central transverse tray coaster bottom 136 and the upstanding side wall 137 a depending annular ridge 141 is defined which is of an internal diameter greater than the external diameter of the raised annular ridge 238 of each protective cover pocket 231 so that the latter may nest within the former when a can having such a bottom tray coaster is nested upon another can having such a protective cover. In FIG. 30 it is indicated that where portions of the annular depending ridge 141 are depressed to provide the communicating portions 142—142 of the drain grooves 139—139 the radially inward walls of these drain grooves thereat are also arranged in a frusto-conical surface which is greater in diameter than the outer frusto-conical surface of the raised annular ridge 238 of each protective cover pocket 231 so as to allow such desired nesting in stacking. It will also be noted from FIGS. 27 and 30 that where the upstanding side wall 137 meets the lateral marginal flange 138, the juncture is internally chamfered at 143 to provide a moisture-collecting mouth for the cup defined by the transverse central area 136 of the tray or coaster 133 and its upstanding side wall 137.

This drainage and collecting feature is advantageous since it is intended that the contents of the cans 33—33 be tempered or chilled in a water bath without removal of the protective cover and the bottom tray structure. In fact, it is intended that the coaster unit 133 advantageously be left mounted on the bottom of each can after the protective cover 33 is removed from the top end thereof and the top of the can 35 is opened in conventional manner, such as by dinking out or cutting therein in the usual manner an opening 144 for desired consumption of the can contents directly therefrom. If the bottom surfaces of the coaster 133 are wiped dry, it may be rested upon any surface which is desirably kept free of moisture, and any condensation which may collect on the cold exterior can walls will then drip down to the chamfered mouth 143 to be drained away therefrom through the drain grooves 139—139 to the chamber 2350 beneath the can within the coaster.

Let it be assumed that the case lot or twenty-four can package 480, including in the proposed manner the composite protective cover structure of FIG. 24 mounted on the top ends of the cans and with the bottom tray structure 1480 of FIG. 25 mounted on the bottom ends of the cans, is to be subdivided or broken up into four six-can packs 380—380. With the carton lot of cans resting upon its bottom tray 1480, one may press down firmly with his left hand, as illustrated at 84 in FIG. 26, upon the top of the six can pack 380 at one end of the carton lot which is not to be separated therefrom and with his right hand, illustrated at 83 therein, resting upon the protective cover 200 of the six can pack 380 which is to be separated from the others, lever this group of cans laterally outward in the direction of the arrow 145, which will readily effect breakaway at the weakened lines 135—135 intervening the quarter section 1380 of the bottom tray structure and those of the adjacent six-can packs with separation of their respective protective covers 200—200 along the weakened lines 131 and 132. The resulting six-can pack 380 may then be handled as a unit, such as for sale in a retail store, for transportation by the customer and chilling by him in any desired manner, such as in a refrigerator or in a bath of ice water. Such a six-can pack is illustrated in FIG. 32 wherein it is indicated that the protective cover 200 and the tying bottom tray section comprising the connected bottom trays or coaster units 133—133 constitute a means of protecting the cans from damage hazard since the marginal flange 91 of the protective cover and the lateral flanges 138—138 of the coaster units 133 will keep the cans 33—33 and their side walls spaced appreciably from adjacent surfaces, such as the support surface illustrated at 146. In fact, such a six-can pack 380 may even be dropped upon a support surface without undue damage to the latter or to the cans since these marginal flanges of the protective cover 200 and the bottom coaster units serve as flexible, resilient shock absorbers. Since the corners of the marginal flange 91 of the protective cover 200 are curved and lie closely adjacent portions of the curved side walls of the can-receptive pockets 231—231 thereat and the edges of the lateral circumambient flanges 138—138 of the corner coasters 133—133 are similarly curved and are likewise disposed in the near vicinity of cylindrical portions of the side walls of the can bottom-receptive coaster pockets, tendency for such flanges to sever or rupture walls of shopping bags is minimized or substantially eliminated.

The stacking of case lot packages 480, 480, one upon the other, in each of which a four-section protective cover, illustrated in FIG. 24, is employed with a bottom tray structure 1380, illustrated in FIG. 25, are used to bind or secure the group of twenty-four cans together as a unit, is illustrated in FIG. 31. FIG. 30 shows the secure relative seating of each coaster 133 upon the protective cover can-receptive pocket 231 therebeneath with nesting of the top portion of the latter in a bottom recess of the former when such stacking is performed. This facilitates attractive display of merchandise in retail stores since the ornamentation, brand and advertising material borne by the exteriors of the cans is exposed directly to view in stacks with the cans therein neatly aligned in vertical tiers.

It will thus be seen that the embodiments of the invention illustrated in FIGS. 9 to 12 inclusive, FIGS. 22 and 23, and FIG. 30 features shaped cover sheets in each of which a can-receptive pocket thereof (31 in FIGS. 9–12 and 231 in FIGS. 22, 23 and 30) has a transverse top area including a central area (32 in FIGS. 9–12, and 232 of the FIGS. 22, 23 and 30 structures) and a surrounding annular or circular raised marginal zone or ridge (38 in FIGS. 9–12 and 238 in FIGS. 22, 23 and 30). Each of these can-receptive pockets also has an annular rib formed in its shaped sidewall defining interiorly thereof the annular rim bead-receptive groove (241 in FIGS. 22, 23 and 30), with the top of this side rib forming an annular depressed shoulder circumscribed about the circular top ridge, as is shown in FIGS. 9 to 12 incl., 22, 23 and 30. It is this annular depressed shoulder circumscribed about the transverse top end of each of these can-receptive pockets which serves as the direct support for a similar bottom rim bead of another one of such cans when superposed thereon in stacking, with the top pocket area within this annular shoulder including its annular marginal ridge nested within such superposed bottom rim bead, as is illustrated in FIGS. 23 and 30.

Let it be assumed that a six-can pack, such as that illustrated at 380 in FIGS. 26 and 32, has been prepared by a consumer for use, such as by chilling. In order to separate a particular can 33 therefrom, he may grasp the selected can and snap it away from the remainder of the group in the manner proposed in FIG. 11, with strip of the can top out of its protective cover pocket 231. This action uncovers the top of the selected can 33 so that it may then be opened as illustrated in FIG. 28 for consumption of contents directly therefrom. However, it may be desired to separate such a single can from the six-can pack to provide a single can unit of the type illustrated in FIG. 33 with its protective cover still in place on the top of the can. Provision for such single can separation may be facilitated by providing the protective cover 200 with suitable perforated or breakaway weakened lines about each can-receptive pocket 231, such as in the manner illustrated in FIG. 34. As therein indicated, one such breakaway line of weakening 147 may extend inwardly from side edge 268 across marginal flange 91 intermediate the locations of adjacent can-receptive pockets 231, 231, passing therebetween along the bottom of the merging portions of the intervening channels 87, 87 and thence following the latter circularly around one of the pockets past the medial finger-engageable sleeve 269, again passing between adjacent can-receptive pockets outwardly toward the end edge 263 and continuing along the bottom of the annular channel past the end finger-engaging sleeve 264, finally to extend back across the marginal flange 91 to the end edge. Similar breakaway lines circumscribed about each can-receptive pocket 231 will thus permit ready separation of one of the cans 33 from a six-can pack, such as that illustrated in FIGS. 26 and 32, by action similar to that illustrated in FIG. 11 without removal of the protective cover or pocket 231 from the can top. In carton lot packages such breakaway weakened lines 147—147 should be stronger than weakened lines 131, 131 and 132, 132 separating the quarter sections of the protective cover.

It will thus be seen that the objects set forth above, among those made apparent from the preceding description, are efficiently attained and, since certain changes may be made in carrying out the above methods and in the article set forth without departing from the scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A protective package of a plurality of cylindrical cans comprising, in combination; a bundle of such cans each conventionally having transverse top and bottom end walls with each of the latter being circumscribed by a raised, circular and laterally-projecting rim bead to define a relatively shallow end recess, said top end rim bead being subtended by a circular, vertical, exterior can sidewall zone; and a can securing and suspending, substantially rectangular, shaped cover sheet of plastic having limited flexibility and some elasticity protectively overlying the top ends of said cans, said sheet being provided with a pair of end and a pair of side margins and having substantially all top and bottom portions thereof respectively disposed in top and bottom transverse planes with the top portions together defining a generally flat pallet platform, said sheet being shaped downwardly from the pallet plane to provide a pair of longitudinally-extending, parallel rows of a plurality of separated, imperforate, cup-shaped, circular bosses each having a transverse, circular central portion and an annular, downwardly-extending sidewall together defining a pocket into which the top end of one of said cans is socketed, the central portion of each of a plurality of said can-receptive pockets being provided with strengthening embossments having the top portions thereof arranged substantially in the pallet plane and the bottom portions thereof located intermediate the pallet and bottom planes with at least areas of said sheet adjacent the annular sidewall of each can-receptive pocket being depressed and extending down to the bottom plane, the annular sidewall of each can-receptive pocket having at its base adjacent the bottom plane a constricted, tensioned, elastic cylindrical sidewall band snugly gripping the can sidewall zone beneath said top rim bead and an annular interior groove in which said top rim bead is tightly received, the embossed central portion of each of said pockets being circumscribed by a marginal annular depressed shoulder located above said interior groove for support thereon of the can bottom rim bead of another such can when superposed upon the package and with the bottom recess of such superposed can receiving therein this embossed central portion, marginal areas of said cover sheet laterally outward of said can-receptive pockets being arranged laterally substantially in a transverse plane intermediate the pallet and bottom planes.

2. A protective package of a plurality of cylindrical cans comprising, in combination; a bundle of such cans each conventionally having transverse top and bottom end walls with each of the latter being circumscribed by a raised, circular and laterally-projecting rim bead to define a relatively shallow end recess, said top end rim bead being subtended by a circular, vertical, exterior can sidewall zone; and a can securing and supsending substantially rectangular, shaped flexible cover sheet of plastic having some elasticity protectively overlying the top ends of said cans, said sheet being provided with a pair of end and a pair of side margins and having substantially all top and bottom portions thereof respectively disposed in top and bottom transverse planes with the top portions together defining a substantially flat pallet platform, said sheet being shaped downwardly from the pallet plane to provide a pair of longitudinally-extending, parallel rows of a plurality of separated, imperforate, cup-shaped, circular bosses each having a transverse, circular central portion and an annular, downwardly-extending sidewall together defining a flexible pocket into which the top end of one of said cans is socketed, the central portion of each of said can-receptive pockets being provided with at least some laterally-extending, strengthening corrugations having the top edges thereof arranged in the pallet plane and the bottom edges thereof located intermediate the pallet and bottom planes, the annular sidewall of each can-receptive pocket extending down to the bottom plane and being surrounded by an annular channel receptive at its open top end of the can bottom rim bead of another such can when superposed upon the package with the bottom recess of such superposed can receiving therein said corrugated central portion of one of the can-receptive pockets of said cover sheet, the annular sidewall of each can-receptive pocket having at its base adjacent the bottom plane a constricted, tensioned, elastic cylindrical sidewall band snugly gripping the can sidewall zone beneath said top rim bead and an annular interior groove in which said top rim bead is tightly received with a gasket fit.

3. The package as defined in claim 2 characterized by the radially outer walls of the annular channels surrounding said can-receptive pockets opposed to said can-receptive pocket sidewalls being at their bases adjacent the bottom plane substantially vertical for snug lateral engagement against cylindrical, cover-applying, substantially vertical flanges of pressing structure to be forced into the annular channels about said can-receptive pockets radially to anchor the base portions of the sidewalls of the latter from inward creepage in socketing the can tops into said pockets.

4. A protective package of a case lot of twenty-four cylindrical cans comprising, in combination; four bundles of six such cans each conventionally having transverse top and bottom end walls with each of the latter being circumscribed by a raised, circular and laterally-projecting rim bead to define a relatively shallow end recess, and a cylindrical side wall intervening said top and bottom rim beads with cylindrical zones thereof disposed adjacent said rim beads; a can securing, substantially rectangular, shaped flexible cover sheet of plastic having some elasticity protectively overlying the top ends of said cans, said sheet being provided with a pair of end and a pair of side margins merged by rounded corners with substantially all top and bottom portions of said shaped sheet being disposed in top and bottom transverse planes with the top portions together defining a substantially flat pallet platform, said sheet being subdivided by weakened lines into four substantially rectangular sections for ready separation of each section therefrom, each substantially rectangular section being provided with a pair of longitudinally-extending, parallel rows of three separated, imperforate, cup-shaped, circular bosses with each of the resulting six bosses in each section having a transverse, circular central portion and an annular downwardly-extending side wall together defining a pocket into which the top end of one of said cans in a bundle of six thereof is socketed, the central portion of each of said can top-receptive pockets being provided with at least some laterally-extending, strengthening corrugations having the top edges thereof arranged in the pallet plane, the annular side wall of each can top-receptive pocket extending down to the bottom plane and being surrounded by an annular channel receptive at its open top end of a bottom rim bead of a superposed similar can and sheet material covering this bottom rim bead in the form of a depending annular ridge of a coaster structure mounted on the bottom end of another such superposed can, the annular side wall of each can top-receptive pocket having at its base adjacent the bottom plane a constricted, tensioned, elastic cylindrical side wall band snugly gripping the can side wall zone adjacent to said top rim bead and an annular interior groove in which said top rim bead is tightly received with a gasket fit; and a can bottom securing, substantially rectangular, shaped flexible tray sheet structure of plastic having some elasticity on which the bottom ends of the twenty-four cans are seated, said bottom tray structure sheet being provided with twenty-four separated, imperforate, cup-shaped, circular coaster pockets each having a transverse, circular central portion and an annular, upwardly-extending side wall into which the bottom end of one of said cans is socketed, the central portion of each coaster pocket being spaced below the bottom end of the can socketed therein to define an intervening chamber, the annular side wall of each can bottom-receptive pocket terminating at the top in a lateral flange circumambient of the can side wall with the tray structure sheet shaped at the junction between each of its can bottom-receptive pocket side walls and the lateral flange surrounding it to define a moisture-collecting annular groove, each can bottom-receptive pocket side wall having a constricted, tensioned, elastic cylindrical side wall band snugly gripping the can side wall zone adjacent the bottom rim bead and an annular interior groove in which said bottom rim bead is seated, the annular side wall of each can bottom-receptive pocket having a plurality of downwardly-extending grooves extending across its constricted band and interior annular groove and communicating the annular moisture-collecting groove with the chamber beneath said can bottom end wall past said can bottom rim bead, the lateral flanges of said can bottom-receptive pockets being connected at points of adjacency by weakened lines of connection for ready breakaway to permit separation of a group of six thereof from the remainder of the tray structure and separation of the six in each group, whereby the case lot may be readily subdivided into four six-can packs with their top and bottom ends tied together by one of the four sections of the cover structure and six of the connected bottom coasters.

5. A method of applying a protective sheet cover to the top end of a cylindrical can conventionally having a transverse top circumscribed by a raised and laterally-projecting rim bead of certain diameter and height and subtended by a downwardly-extending cylindrical sidewall zone of certain lesser diameter, comprising providing in a sheet of elastic material a circular can top-receptive pocket having a generally cylindrical sidewall provided with an annular interior groove of less diameter and width than the diameter and height of the rim bead and a constricted annular gripping band of lesser diameter than the can sidewall zone, arranging about the pocket at certain distances from each other across the latter substantially vertical portions of said sheet defining with the pocket sidewall a circumambient depressed channel, nesting in the channel a rigid flange pressing structure having substantially vertical portions located greater distances apart across the pocket than the vertical sheet portions thereof when the vertical portions of said pocket are stretched by the can rim bead, moving the rigid flange structure and the can relative to one another to force the annular gripping band over the can bead rim and into gripping engagement with the can sidewall zone and seating the can rim bead within said interior groove, and withdrawing the flange pressing structure from the channel while the pocket is held on the can top by the rim bead.

6. A method of applying a protective sheet cover to the top end of a cylindrical can conventionally having a transverse top circumscribed by a raised and laterally-projecting rim bead of certain diameter and height and subtended by a downwardly-extending cylindrical sidewall zone of certain lesser diameter, comprising providing in a sheet of elastic material a circular can top-receptive pocket having a generally cylindrical sidewall provided with an annular interior groove of less diameter and width than the diameter and height of the rim bead and a constricted annular gripping band of lesser diameter than the can sidewall zone, arranging about the pocket on a circle of appreciably greater diameter than the sidewall of the latter substantially vertical portions of said sheet defining with the pocket sidewall a circumambient depressed channel, nesting into the channel a rigid cylindrical pressing flange having substantially vertical outer portions arranged on a circle of a diameter substantically equal to said greater diameter, telescoping the cylindrical pressing flange down over the can top to force the pocket carried thereby over the latter to gripping engagement of the can sidewall zone by the annular gripping band with stretch of the latter down over the cam rim bead and seating the rim bead within the interior groove, and withdrawing the cylindrical pressing flange from about the can top and the pocket while the latter is held on the can top by the rim bead.

7. The method as defined in claim 6 characterized by providing the cover sheet with a plurality of such can top-receptive pockets separated at points of adjacency by mergence of their surrounding depressed channels, a cylindrical rigid pressing flange being provided for each pocket with adjacent portions of these pressing flanges received in the merged adjacent portions of the channels and free thereat from channel sidewall engagement, whereby said gripping band is allowed to stretch over said can rim bead into the space between said pressing flange and said cylindrical pocket sidewall as said pressing flange is telescoped over said can tops.

8. A protective package of a plurality of closed and sealed cans comprising a bundle of such cans each having a vertical sidewall of certain external transverse dimensions and a closing transverse top end wall circumscribed by a laterally-projecting rim bead of greater outside dimensions subtended by a circumambient downwardly-extending exterior zone of said sidewall; and a common cover protectively overlying the closed top ends of said cans and consisting solely of a can securing, one-piece, pressure-shaped and set sheet formed from elastic plastic sheet material initially of substantially uniform thickness, said shaped cover sheet having formed therein and extending from the top side thereof a plurality of separated and inverted cupped pockets into each of which the top end of one of said cans is socketed; each of said pockets having a transverse top end completely overlying the top end of the can socketed therein and an integral, depending, circumambient sidewall with the later having defined therein a constricted and tensioned, elastic gripping band of less transverse dimensions than said can sidewall zone when the can to be socketed therein is free therefrom, and a circumambient internal groove of greater transverse dimensions than said band intervening the latter and said pocket transverse end with the upper end of said band and the bottom side of said groove integrally connected by a merging lateral shoulder, said band of each pocket being snapped down over said rim bead of one of said cans to gripping engagement of said sidewall zone of this can with said rim bead thereof located in said groove and projecting laterally over said lateral shoulder for support on the latter when the package is lifted by grasp of said cover sheet; the top end of each of said pockets having a transverse top area including a raised circumambient marginal zone circumscribed by a circumambient depressed shoulder located immediately above and substantially aligned with said internal rim bead-receptive groove.

9. The package as defined in claim 8 characterized by said cover sheet having at least the raised marginal zones of the top areas of said can-receptive pockets substantially disposed in one common transverse top plane with no other portions thereof extending appreciably above the latter, at least sections of the elastic sidewall bands of said can-receptive pockets at locations circumambiently distributed about the bases of the latter being flanked by depressed areas of said cover sheet, the circumambient depressed shoulder of each pocket circumscribing said raised marginal zone of the top area of the latter being of a shape similar to an inside transverse dimensions no greater than the inside transverse dimensions of a similar bottom rim bead of one of such cans for support thereon with this top area nested within this bottom rim bead to facilitate stacking of such packages.

10. The package as defined in claim 9 characterized by the bottoms of the flanking depressed areas being disposed in a common transverse bottom plane located below and substantially parallel to said top plane, said cover having a pair of longitudinally-spaced and upwardly-extending, finger-engageable sleeve means each located in a medial area surrounded by a plurality of said pockets with at least portions of the sidewalls of said sleeve means extending upwardly from the bottom plane toward the top pane.

11. The package as defined in claim 10 characterized by said cover sheet having laterally outward of said can-receptive pockets marginal wall means extending upwardly from the bottom plane to an intermediate plane and terminating at the latter in a lateral outwardly-extending flange defining the marginal edges of said cover sheet.

12. A protective package of a plurality of closed and sealed cans comprising a bundle of such cans each having a cylindrical side wall, a closed transverse top end wall and an axially and radially extending circumferential top bead having a top, bottom and radially outwardly extending side portions; and a common cover and carrier protectively overlying the closed top ends of said cans, consisting solely of a can securing, one-piece, pressure-shaped and set sheet formed from elastic plastic sheet material initially of a substantially uniform thickness of the order of .010 inch, said shaped cover sheet having formed therein and extending upwardly from the top side thereof a plurality of separated and inverted cupped pockets into each of which the top end of one of said cans is socketed; each of said pockets having a transverse top end completely overlying the top end of the can socketed therein and an integral, depending, circular side wall with the latter having defined therein a continuous circular constricted and tensioned, elastic gripping band of smaller diameter than the diameter of said can side wall when the can to be socketed therein is free therefrom, and an annular internal groove of greater diameter than said band, said groove being disposed intermediate the band and said pocket transverse end with the upper end of said band and the bottom side of said groove integrally connected by a merging lateral shoulder, said circular band of each pocket being snapped down over said rim bead of one of said cans to tension said band in gripping engagement wtih said side wall of this can with said rim bead thereof located in said groove and projecting laterally over said lateral shoulder for support on the latter when the package is lifted by grasp of said cover sheet, said cover sheet having medial areas intermediate said pockets.

13. A cover and carrier for protecting and carrying a plurality of closed and sealed cans of the type having a cylindrical side wall, a closed transverse top end wall and an axially and radially extending circumferential top bead having a top, bottom and radially outwardly extending side portions; said cover and carrier being effective to protectively overlie the closed top ends of said cans, and consisting solely of a one-piece, pressure-shaped and set sheet formed from elastic plastic sheet material initially of a substantially uniform shickness of the order of .010 inch, said shaped cover sheet having formed therein and extending upwardly from the top side thereof a plurality of separated and inverted scupped pockets into each of which the top end of one of said cans is adapted to be socketed; each of said pockets having a transverse top end completely overlying the top end of the can socketed therein and an integral, depending, circular side wall with the latter having defined therein a continuous circular constricted and tensioned, elastic gripping band of smaller diameter than the diameter of said can side wall when the can to be socketed therein is free therefrom, and an annular internal groove of greater diameter than said band, said groove being disposed intermediate the band and said pocket transverse end with the upper end of said band and the bottom side of said groove integrally connected by a merging lateral shoulder, said circular band of each pocket being adapted to be snapped down over said rim bead of one of said cans to tension said band in gripping engagement with said side wall of this can with said rim bead thereof located in said groove and projecting laterally over said lateral shoulder for support on the latter when the package is lifted by grasp of said cover sheet, said cover sheet having medial areas intermediate said pockets.

14. A protective package of a plurality of closed and sealed cans comprising a bundle of such cans each having a cylindrical side wall, a closed transverse top end wall and an axially and radially extending circumferential top bead having a top, bottom and radially outwardly extending side portions; and a common cover and carrier protectively overlying the closed top ends of said cans, consisting solely of a can securing, one-piece, pressure-shaped and set sheet formed from elastic plastic sheet material initially of a substantially uniform thickness of the order of .010 inch, said shaped cover sheet having formed therein and extending upwardly from the top side thereof a plurality of seperated and inverted cupped pockets into each of which the top end of one of said cans is socketed; each of said pockets having a transverse top end completely overlying the top end of the can socketed therein and an integral, depending, circular side wall with the latter having defined therein a continuous circular constricted and tensioned, elastic gripping band of smaller diameter than the diameter of said can side wall when the can to be socketed therein is free therefrom, and an annular internal groove of greater diameter than said band, said groove being disposed intermediate the band and said pocket transverse end with the upper end of said band and the bottom side of said groove integrally connected by a merging lateral shoulder, said circular band of each pocket being snapped down over said rim bead of one of said cans to tension said band in gripping engagement with said side wall of this can with said rim bead thereof located in said groove and projecting laterally over said lateral shoulder for support on the latter when the package is lifted by grasp of said cover sheet, said cover sheet having medial areas intermediate said pockets with at least two of said medial areas having finger-engageable apertures formed therein.

15. A protective package of a plurality of cylindrical cans comprising, in combination, a bundle of such cans each conventionally having transverse top and bottom end walls each circumscribed by a laterally-projecting rim bead adjacent to a cylindrical exterior side wall zone, a can securing shaped cover sheet of elastic material protectively overlying the top ends of said cans, said sheet having formed therein and extending from one side thereof a plurality of separated cupped pockets into each of which the top ends of one of said cans is socketed, each pocket having a constricted tensioned elastic side wall band which is of appreciably less transverse dimensions than the can top rim bead when the can top end socketed in said pocket is freed therefrom, said tensioned side wall band being snapped down over said top end rim bead to snug and gripping engagement of the can side wall zone adjacent thereto with said top end rim bead projecting laterally thereabove for support thereon, and a can securing shaped bottom tray sheet of elastic material having formed therein and extending from the bottom side thereof a plurality of separated cupped pockets into each of which the bottom end of one of said cans is socketed, each bottom tray pocket having a constricted tensioned elastic side wall band which is of appreciably less transverse dimensions than the bottom end can rim bead when the can bottom end socketed in said pocket is freed therefrom, said tensioned side wall band of each bottom tray pocket being snapped up over said bottom end rim bead to snug and gripping engagement of the can side wall zone adjacent thereto with the latter rim bead projecting laterally below the tensioned side wall band of the bottom tray pocket, said bottom tray structure being provided with lines of weakening between adjacent can bottom receptive pockets for separation of each from the remainder to remain on the can bottom end socketed therein as a coaster, each of said coaster pockets being circumscribed by a zone of the bottom tray sheet which extends laterally outward away from the cylindrical can side wall and shaped to provide a moisture-collecting annular groove about the latter.

16. A protective package of a plurality of cylindrical cans comprising, in combination, a bundle of such cans each conventionally having transverse top and bottom end walls each circumscribed by a laterally-projecting rim bead adjacent to a cylindrical exterior side wall zone, a can securing shaped cover sheet of elastic material protectively overlying the top ends of said cans, said sheet having formed therein and extending from one side thereof a plurality of separated cupped pockets into each of which the top ends of one of said cans is socketed, each pocket having a constricted tensioned elastic side wall band which is of appreciably less transverse dimensions than the can top rim bead when the can top end socketed in said pocket is freed therefrom, said tensioned side wall band being snapped down over said top end rim bead to snug and gripping engagement of the can side wall zone adjacent thereto with said top end rim bead projecting laterally thereabove for support thereon, and a can securing shaped bottom tray sheet of elastic material having formed therein and extending from the bottom side thereof a plurality of separated cupped pockets into each of which the bottom end of one of said cans is socketed, each bottom tray pocket having a constricted tensioned elastic side wall band which is of appreciably less transverse dimensions than the bottom end can rim bead when the can bottom end socketed in said pocket is freed therefrom, said tensioned side wall band of each bottom tray pocket being snapped up over said bottom end rim bead to snug and gripping engagement of the can side wall zone adjacent thereto with the latter rim bead projecting laterally below the tensioned side wall band of the bottom tray pocket, said bottom tray structure being provided with lines of weakening between adjacent can bottom receptive pockets for separation of each from the remainder to remain on the said coaster pockets being circumscribed by a zone of the bottom tray sheet which extends laterally outward away from the cylindrical can side wall and shaped to provide a moisture-collecting annular groove about the latter, each of said coaster-defining pockets in said bottom tray structure having a transverse central portion spaced below the transverse bottom end wall of the can socketed therein to define an intervening moisture-receiving chamber and with the side wall of said pocket being provided with a plurality of downwardly-extending interior grooves to feed moisture collected in the moisture-collecting annular groove to said chamber.

References Cited by the Examiner
UNITED STATES PATENTS

| | | | |
|---|---|---|---|
| 2,255,576 | 9/1941 | Wesselman | 53—48 |
| 2,302,045 | 11/1942 | Neumann | 206—56 |
| 2,350,950 | 6/1944 | Wiley | 220—42 |
| 2,493,439 | 1/1950 | Braund | 18—56 |
| 2,531,539 | 11/1950 | Smith | 18—19 |
| 2,531,540 | 11/1950 | Smith | 18—56 |
| 2,540,743 | 2/1951 | Leach | 53—48 |
| 2,604,223 | 7/1952 | Horning. | |
| 2,754,962 | 7/1956 | Scrymgeour | 206—65 |
| 2,765,493 | 10/1956 | Winstead | 18—19 |
| 2,787,397 | 4/1957 | Radford | 220—72 |
| 2,874,835 | 2/1959 | Poupitch | 206—65 |
| 2,887,117 | 5/1959 | Rosholt | 220—60 |
| 2,896,779 | 7/1959 | Armel | 206—60 |
| 2,922,563 | 1/1960 | Aldington | 215—41 |
| 2,949,204 | 8/1960 | Edwards | 206—65 |
| 2,964,210 | 12/1960 | Paley. | |
| 2,997,169 | 8/1961 | Poupitch | 206—65 |
| 3,004,288 | 10/1961 | Garnder | 18—56 X |
| 3,086,651 | 4/1963 | Poupitch | 206—65 |

FOREIGN PATENTS

| | | |
|---|---|---|
| 141,902 | 6/1935 | Austria. |

THERON E. CONDON, *Primary Examiner.*

EARLE J. DRUMMOND, FRANKLIN T. GARRETT, GEORGE O. RALSTON, *Examiners.*